(12) United States Patent
Pilli

(10) Patent No.: US 12,455,883 B2
(45) Date of Patent: Oct. 28, 2025

(54) GraphQL FILTER DESIGN FOR A GraphQL APPLICATION PROGRAMING INTERFACE (API) SCHEMA

(71) Applicant: Oracle International Corporation, Redwood Shores, CA (US)

(72) Inventor: Naveen Pilli, Milton (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 183 days.

(21) Appl. No.: 18/331,844

(22) Filed: Jun. 8, 2023

(65) Prior Publication Data

US 2024/0411759 A1    Dec. 12, 2024

(51) Int. Cl.
*G06F 16/2455* (2019.01)
*G06F 9/54* (2006.01)
*G06F 16/2453* (2019.01)
*G06F 16/248* (2019.01)

(52) U.S. Cl.
CPC .......... *G06F 16/2455* (2019.01); *G06F 9/541* (2013.01); *G06F 16/24542* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 9,009,137 B2 | 4/2015 | Khosravy et al. | |
| 9,418,085 B1 | 8/2016 | Shih et al. | |
| 10,558,671 B2 | 2/2020 | Tamjidi et al. | |
| 11,016,968 B1 | 5/2021 | Hoover | |
| 11,055,282 B1 | 7/2021 | Fletcher | |

(Continued)

FOREIGN PATENT DOCUMENTS

CN    111198678 A    5/2020

OTHER PUBLICATIONS

Cheng, Sijin, and Olaf Hartig. "LinGBM: A Performance Benchmark for Approaches to Build GraphQL Servers (Extended Version)." arXiv preprint arXiv:2208.04784 (2022). (Year: 2022).*

(Continued)

*Primary Examiner* — Richard L Bowen
(74) *Attorney, Agent, or Firm* — Kilpatrick Townsend & Stockton LLP

(57) ABSTRACT

A technique for creating a GraphQL Application Programing Interface (API) schema is disclosed. The technique includes generating a filter input object for an object defined in a GraphQL API schema. The filter input object provides the ability for a GraphQL API user (i.e., an API developer or an end user) to perform filtering operations in a query operation on schema objects defined in a GraphQL API schema. The filter input object comprises a set of object attributes and a set of custom attributes. The custom attributes provide the ability for an API developer (or an end user) to perform complex filtering operations in a query operation on schema objects defined in a GraphQL API schema. The technique further includes receiving a query operation to be performed and executing the query operation against a backend datasource to obtain a query result. The query result is transmitted to a GraphQL API user.

19 Claims, 20 Drawing Sheets

(56) References Cited

U.S. PATENT DOCUMENTS

| | | | |
|---|---|---|---|
| 11,720,532 | B2 | 8/2023 | Tamjidi et al. |
| 11,734,265 | B1 | 8/2023 | Sagar |
| 11,775,363 | B1 | 10/2023 | Wilton et al. |
| 11,880,726 | B1 | 1/2024 | Ahmadizadeh et al. |
| 11,886,394 | B2 | 1/2024 | Trocki et al. |
| 11,914,631 | B2 | 2/2024 | Acharya |
| 12,182,114 | B1 | 12/2024 | Threlkeld et al. |
| 12,339,836 | B2 | 6/2025 | Pilli et al. |
| 2017/0116292 | A1* | 4/2017 | Boehme ............ G06F 16/24537 |
| 2019/0196890 | A1* | 6/2019 | Bucchi ................. G06F 16/951 |
| 2019/0340287 | A1 | 11/2019 | Tamjidi et al. |
| 2019/0370370 | A1 | 12/2019 | Wittern et al. |
| 2019/0392043 | A1 | 12/2019 | Wilson et al. |
| 2020/0004730 | A1 | 1/2020 | Brown et al. |
| 2020/0097559 | A1 | 3/2020 | Wittern et al. |
| 2020/0226140 | A1 | 7/2020 | Tamjidi et al. |
| 2020/0311085 | A1* | 10/2020 | Lucas ................. G06F 16/9024 |
| 2021/0248114 | A1 | 8/2021 | Tamjidi et al. |
| 2021/0248143 | A1 | 8/2021 | Khillar et al. |
| 2021/0294679 | A1 | 9/2021 | Thakur et al. |
| 2022/0019400 | A1 | 1/2022 | Law et al. |
| 2022/0092116 | A1 | 3/2022 | Gupta et al. |
| 2022/0253474 | A1 | 8/2022 | Acharya |
| 2022/0300351 | A1 | 9/2022 | Phelan et al. |
| 2023/0089365 | A1 | 3/2023 | Manzano et al. |
| 2023/0138971 | A1 | 5/2023 | Krishnan et al. |
| 2023/0207069 | A1* | 6/2023 | Cheung ................. G16B 50/50 707/693 |
| 2023/0222125 | A1 | 7/2023 | Chitimbo et al. |
| 2023/0252233 | A1 | 8/2023 | Gutierrez et al. |
| 2023/0306021 | A1 | 9/2023 | Chauhan et al. |
| 2023/0359667 | A1 | 11/2023 | Zionts et al. |
| 2024/0036910 | A1 | 2/2024 | Stephen et al. |
| 2024/0037495 | A1 | 2/2024 | Stephen et al. |
| 2024/0045743 | A1 | 2/2024 | Sagar et al. |
| 2024/0111766 | A1 | 4/2024 | Newman et al. |
| 2024/0111767 | A1 | 4/2024 | Walraven et al. |
| 2024/0394248 | A1 | 11/2024 | Pilli et al. |
| 2024/0411759 | A1 | 12/2024 | Pilli |
| 2025/0068626 | A1 | 2/2025 | Tangari et al. |
| 2025/0094737 | A1 | 3/2025 | Tangari et al. |

OTHER PUBLICATIONS

AWS AppSync, AWS, Available Online at: https://aws.amazon.com/appsync/, Accessed from Internet on Dec. 26, 2022, 9 pages.

AWS AppSync Developer Guide, Available Online at: https://docs.aws.amazon.com/pdfs/appsync/latest/devguide/appsync-dg.pdf#attaching-a-data-source, 2022, 601 pages.

Connect Databases to Hasura GraphQL Engine, Hasura, Available Online at: https://hasura.io/docs/latest/databases/quickstart/, Accessed from Internet on Jan. 31, 2023, 3 pages.

Filtering, ChilliCream, Available Online at: https://chillicream.com/docs/hotchocolate/v12/fetching-data/filtering, 13 pages.

GraphQL, Stardog Documentation Latest, Available Online at: https://docs.stardog.com/query-stardog/graphql, Accessed from Internet on Dec. 26, 2022, 29 pages.

Hasura GraphQL Engine Documentation, Hasura Inc., Available Online at: https://hasura.io/docs/latest/index/, Accessed from Internet on Jan. 31, 2023, pp. 1-4.

Introduction, ChilliCream, Available Online at: https://chillicream.com/docs/hotchocolate/v12, Jan. 1, 2023, 1 page.

Overview, ChilliCream, Available Online at: https://chillicream.com/docs/hotchocolate/v12/fetching-data, pp. 1-2.

Postgres: Filter Query Results/Search Queries, Hasura, Available Online at: https://hasura.io/docs/latest/queries/postgres/query-filters/, Accessed from Internet on Jan. 31, 2023, pp. 1-32.

Postgres: Nested Object Queries, Hasura, Available Online at: https://hasura.io/docs/latest/queries/postgres/nested-object-queries/, Accessed from Internet on Jan. 31, 2023, pp. 1-4.

Schema, Hasura, Available Online at: https://hasura.io/docs/latest/schema/overview/, Accessed from Internet on Jan. 31, 2023, 1 page.

Type-Graphql-Filter, Available Online at: https://github.com/kontist/type-graphql-filter, Accessed from Internet on Jan. 31, 2023, 2 pages.

Using Data Sources, Smartbear, Available Online at: https://support.smartbear.com/readyapi/docs/testing/data-driven/using.html, 2021, 3 pages.

Angele et al., GraphSPARQL A GraphQL Interface for Linked Data, Association for Computing Machinery, Available Online at: https://dl.acm.org/doi/pdf/10.1145/3477314.3507655, Apr. 25-29, 2022, pp. 778-785.

Mashraki, Automatic GraphQL Filter Generation, Available Online at: https://entgo.io/blog/2021/07/01/automatic-graphql-filter-generation/, Jul. 1, 2021, pp. 1-9.

"An Overview of GraphQL", Hasura, Available Online at: https://hasura.io/graphql/, Accessed from Internet on Dec. 26, 2022, 1 page.

"Autogenerate GraphQL Schemas using the Stepzen Import CLI", StepZen, Available Online at: https://stepzen.com/docs/quick-start, 2022, 2 pages.

"GraphQL", UI Bakery Docs, Available Online at: https://docs.uibakery.io/data-sources/data-sources/graphql, Dec. 26, 2022, 3 pages.

"GraphQL Introspection", Hasura, GraphQL Tutorial, Available Online at: https://hasura.io/learn/graphql/intro-graphql/introspection/, Accessed from Internet on Dec. 26, 2022, 5 pages.

"Schemas", IntelliJ IDEA Documentation, Available Online at: https://www.jetbrains.com/help/idea/schemas.html#introspect-system-catalogs-for-a-data-source, Dec. 20, 2022, 12 pages.

"Supporting Default Introspection for a GraphQL API", IBM Documentation, Available Online at: https://www.ibm.com/docs/en/api-connect/10_reserved_instance?topic=api-supporting-default-introspection-graphql, Dec. 6, 2022, 2 pages.

"TIBCO Data Virtualization", User Guide, Available Online at: https://docs.tibco.com/pub/tdv/8.0.0/doc/pdf/TIB_tdv_8.0.0_UsersGuide.pdf?id=1, Nov. 9, 2018, 704 pages.

"Using the GraphQL Schema Editor", IBM Documentation, Available Online at: https://www.ibm.com/docs/en/api-connect/10_reserved_instance?topic=api-using-graphql-schema-editor, Dec. 6, 2022, 7 pages.

U.S. Appl. No. 18/322,352, Final Office Action mailed on Nov. 22, 2024, 69 pages.

U.S. Appl. No. 18/322,352, Non-Final Office Action mailed on Apr. 10, 2024, 54 pages.

U.S. Appl. No. 18/322,352, Notice of Allowance mailed on Apr. 9, 2025, 14 pages.

Farre et al., "GraphQL Schema Generation for Data-Intensive Web APIs", International Conference on Model and Data Engineering, Oct. 28-31, 2019, pp. 184-194.

* cited by examiner

```
Validate Save  Generate schema  Actions  ↰ ↱   Q Search here...   ∨ ∧ ✕   Export 1▾ type Country {
 2      countryname: String
 3      pin: ID!
 4  }
 5
 6▾ type Courses {
 7      codename: String
 8      credits: String
 9      id: ID!
10      name: String
11      strength: String
12  }
13
14▾ type Employee {
15      city: String
16      id: ID!
17      name: String
18      pin: String
19      student_Idcard_Number: String
20  }
```

```
Schema
[Validate] [Save] [Generate schema] [Actions] [↶] [↷]    [🔍 Search here...]   [×] [∧] [∨]    [Export]

26  }"""
27  """graphql schema mutations"""
28  type Mutation {
29    createCountry(input: CountryInput): Country  ─710
30    createCourses(input: CoursesInput): Courses
31    createEmployee(input: EmployeeInput): Employee
32    createMovies(input: MoviesInput): Movies
33    createState(input: StateInput): State
34    createStudents(input: StudentsInput): Students
35    deleteCourses(id: ID!): Courses
36    deleteState(pin: ID!): State
37    deleteStudents(id: ID!): Students
38    updateCountry(input: CountryInput)" Country
39    updateCourses(input: CoursesInput)" Courses
40    updateEmployee(input: EmployeeInput)" Employee
41    updateMovies(input: MoviesInput)" Movies
42    updateState(input: StateInput)" State
43    updateStudents(input: StudentsInput)" Students
44  }
45  """graphql schema queries"""
46  type Query {
47    getCountry(pin: ID!): Country  ─708
48    getCourses(id: ID!): Courses
49    getEmployee(id: ID!): Employee
50    getMovies(id: ID!): Movies
51    getState(pin: ID!): State
52    getStudents(id: ID!): Students
53
54
```

```
Validate  Save  Generate schema  Actions  ← →    Q Search here...                    ∨ ∧ X   Export 1▸  type Post {
 2       id : ID!
 3       title : String
 4       desc : String
 5       hits : Int
 6▸      rating : Int
 7   }
 8   type Query{
 9       listPosts( filter : PostFilterInput ) : [ Post ]
10   }
11   input PostFilterInput {
12       id: IDFilterInput
13       title : StringFilterInput
14▸      desc : StringFilterInput
15       hits : IntFilterInput
16       rating : IntFilterInput
17       _operator: LogicalOperator
18       _expr: [PostFilterInput!]
19       _not : PostFilterInput
20   }
```

FIG. 9

```
Validate  Save  Generate schema  Actions  ←  →  ?         Q Search here...                    ∨  ∧  X    Export 1▸
 2    enum LogicalOperator {
 3        AND
 4        OR
 5    1004 }
 6▸
 7    input IntBetweenInput {
 8        floor : Int!
 9    1006  ceiling : Int!
10    }
11    input IntFilterInput {
12        ne: Int
13        eq: Int
14        le: Int
15        lt: Int
16        ge: Int
17        gt: Int
18    1008  between: IntBetweenInput
19        in : [In]
20        not_in : [Int]
       is_null: Boolean
    }
    input StringBetweenInput {
        floor : String!
    1010  ceiling : String!
    }
```

FIG. 10

```
Validate Save Generate schema Actions ← →    ∨ ∧ X
                               Q Search here...    Export 1 ▸  input StringFilterInput {
2        ne: String
3        eq: String
4        le: String
5        lt: String
6        ge: String
7        gt: String
8        like: String
9        between: StringBetweenInput  //inclusive
10       in : [String]
11       not_in : [String]
12       is_null: Boolean
13   }
14 ▸ input IDBetweenInput {
15       floor : ID!
16       ceiling : ID!
17   }
18   input IDFilterInput {
19       ne: ID
20       eq: ID
         le: ID
         lt: ID
         ge: ID
         gt: ID
         like: ID
         between: IDBetweenInput
         in : [ID]
         not_in : [ID]
         is_null: Boolean
     }
```

```
1  {
2   listCourses(filter: {
3    _expr: [
4     {
5      name: {
6       _like "%Intelligence"
7      }
8     },
9     {
10     name: {
11      _like "%Computer%"
12     }
13    }
14   ],
15   _operator: OR
16  }) {
17   id
18   codename
19   credits
20   name
21   strength
22  }
23 }
```

1402

```
{
 "data": {
  "listCourses": [
   {
    "id": "1",
    "codename": "CSAI211",
    "credits": "4",
    "name": "Artificial Intelligence",
    "strength": "60"
   },
   {
    "id": "5",
    "codename": "CSAI223",
    "credits": "5",
    "name": "Computer Organization",
    "strength": "90"
   },
   {
    "id": "9",
    "codename": "CSAI234",
    "credits": "6",
    "name": "Computer Architecture",
    "strength": "80"
   }
  ]
 }
}
```

```
Run | Format | Merge | Copy | History | Schema

1  {
2  ▸ listCourses(filter: {
3        _expr: [
4          {
5            credits: {
6              _gt: "6"
7            }
8          },{
9            name: {
10             _like: "%Engineering"
11           }
12         }
13       ],_operator: AND
14    },{
15        name: {
16          _like "%Computer%"
17        }
18    }
19    ],_operator: OR
20    }){
21    id
22  ▸ codename
23    credits
24    name
25    strength
26  }
27 }
```

1502

```
{
  "data": {
    "listCourses": [
      {
        "id": "5",
        "codename": "CSAI223",
        "credits": "5",
        "name": "Computer Organization",
        "strength": "90"
      },{
        "id": "9",
        "codename": "CSAI234",
        "credits": "6",
        "name": "Computer Architecture",
        "strength": "80"
      },{
        "id": "10",
        "codename": "CSAI241",
        "credits": "7",
        "name": "Software Engineering",
        "strength": "60"
      },{
        "id": "15",
        "codename": "CSAI283",
        "credits": "7",
        "name": "Software Engineering",
        "strength": "70"
      }
    ]
  }
}
```

GraphQL FILTER DESIGN FOR A GraphQL APPLICATION PROGRAMING INTERFACE (API) SCHEMA

BACKGROUND

GraphQL is a web-based query language specification for APIs (Application Programing Interfaces) in which a client can define the structure of the data to be returned by a server. Using GraphQL, instead of making multiple requests to different endpoints to fetch different pieces of data, a client can make a single request to the GraphQL API and specify exactly what data it needs. GraphQL allows for more precise and efficient data fetching, reduces over-fetching and under-fetching of data, and enables clients to request only the data they need, which can improve network performance and reduce network overhead.

GraphQL uses a predefined schema that describes the data that can be queried and the types of data that can be fetched from various backend data sources. A GraphQL API schema generally defines object types with fields and a set of operations that represent the data that can be retrieved from a GraphQL API from the backend data sources. A GraphQL schema is generally defined using a specification such as a Schema Definition Language (SDL) which describes the object types, the fields of the object types, and their relationships. A GraphQL server uses a GraphQL API schema and a set of resolver functions (collection of functions that are responsible for resolving (returning) the data for fields in the schema) to parse an incoming query request from an end user, identify the query operation to execute, execute the operation against one or more backend data sources and return the results of the operation to an end user.

Typically, as part of developing a GraphQL API, a user (e.g., GraphQL API developer) writes a GraphQL schema comprising a set of object types, fields and queries that the GraphQL API is allowed to execute. The API developer additionally writes the code or logic that describes how the object types of the schema map to resolvers and the logic for fetching or modifying the data from the various backend data sources. In some instances, the developer may additionally write code to define custom types and fields that map to the data model of their application via the schema. The process of writing a GraphQL API schema is generally a time consuming task for the API developer requiring considerable manual effort on the part of the developer to accurately describe the schema to define the object types and object fields that represent data that can be retrieved from the API as well as the group of operations that the API is allowed to execute in the schema. There is thus a need for developing techniques that facilitate more efficient GraphQL API development than what is possible by existing implementations.

BRIEF SUMMARY

The present disclosure relates generally to techniques for creating a GraphQL Application Programing Interface (API) schema. More specifically, but not by way of limitation, this disclosure describes techniques for generating a filter input object for an object defined in a GraphQL API schema. The filter input object provides the ability for a GraphQL API user (i.e., an API developer or an end user) to perform simple filtering operations as well complex filtering operations on a query operation executed on an object defined in a GraphQL API schema. Using the filter input object, a GraphQL API user can construct simple as well as complex filtering arguments that can be applied to different backend datasources such as REST APIs, relational databases and so on.

In certain embodiments, a GraphQL Application Programing Interface (API) schema design system for creating a GraphQL API schema is disclosed. The system obtains a GraphQL API schema comprising a set of object types. An object type comprises a set of one or more fields associated with the object type. The system then generates a filter input object for the object type. The filter input object comprises a set of object attributes. Each object attribute in the set of object attributes corresponds to a field in the set of fields associated with the object type. The system additionally generates a filter input object datatype for the object attribute. The filter input object datatype for the object attribute is specific to a datatype of the field of the object type corresponding to the object attribute.

In certain embodiments, the system then generates a set of custom attributes for the filter input object. The set of custom attributes include an expression attribute, a logical operator attribute and a negation operator attribute. The system generates a query object type for the object type. The query object type identifies a query operation to be performed on the object type. The query operation comprises a filter input variable that identifies the filter input object associated with the object type. The system then provides the GraphQL API schema comprising the set of one or more object types, the filter input object associated with the object type, the filter input object datatype associated with the object attribute and the query object associated with the object type, via a user interface.

In certain embodiments, the system receives a query request. The query request identifies the query operation to be performed on the object type. In certain examples, the query operation comprises the filter input variable and the filter input variable identifies a first expression and a second expression to be evaluated by the query operation. The first expression and the second expression are defined using the expression attribute defined in the filter input object associated with the object type. The system executes the query request against a backend datasource to obtain a query result and transmits the query result via the user interface associated with the system.

BRIEF DESCRIPTION OF THE DRAWINGS

Features, embodiments, and advantages of the present disclosure are better understood when the following Detailed Description is read with reference to the accompanying drawings.

FIG. 6 depicts an example of a graphical user interface (GUI) for presenting a GraphQL API schema, according to certain embodiments.

FIG. 7 depicts an example of a graphical user interface (GUI) comprising GraphQL mutation types and GraphQL query types defined in a GraphQL API schema, according to certain embodiments.

FIG. 9 depicts an example of a filter input object generated for an object type defined in a GraphQL API schema, according to certain embodiments.

FIG. 10 depicts an example of a filter input object datatype generated for an object attribute in a filter input object defined in a GraphQL API schema, according to certain embodiments.

FIG. 11 depicts additional examples of filter input object datatypes generated for object attributes in a filter input object defined in a GraphQL API schema, according to certain embodiments.

FIG. 13 is an example of a graphical user interface (GUI) for submitting a GraphQL query and displaying a query result, according to certain embodiments.

FIG. 14 is another example of a graphical user interface (GUI) for submitting a GraphQL query and displaying a query result, according to certain embodiments.

FIG. 15 is yet another example of a graphical user interface (GUI) for submitting a GraphQL query and displaying a query result, according to certain embodiments.

DETAILED DESCRIPTION

Figure 1:
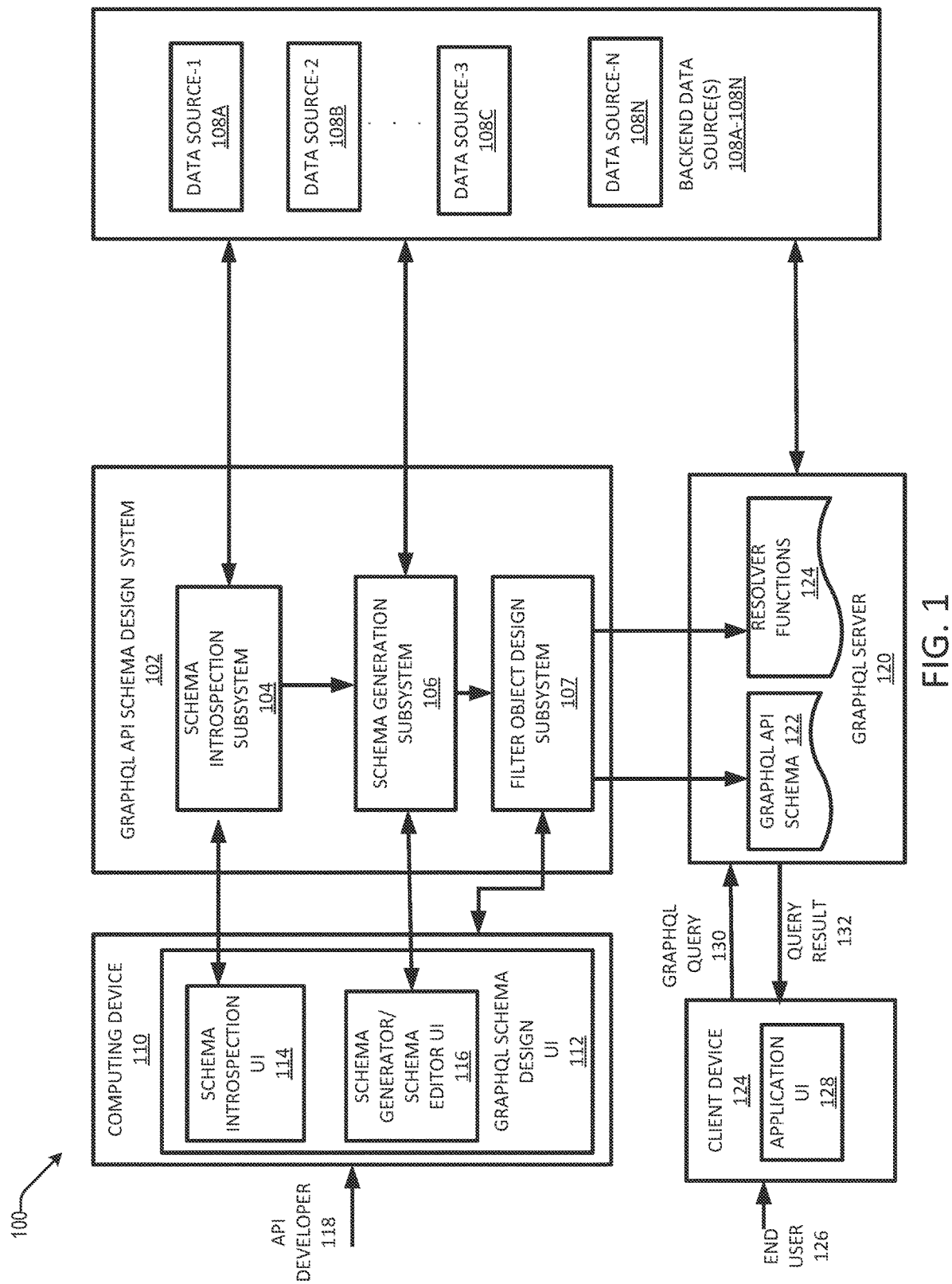
FIG. 1 depicts an example of a computing environment that includes a GraphQL Application Programing Interface (API) schema design system for creating a GraphQL API schema, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

As previously described, GraphQL is a query language specification for APIs and includes a server-side runtime for executing queries. GraphQL API development traditionally involves a user (e.g., an API developer) having to explicitly create an API schema (e.g., a GraphQL API schema) to define object types, object fields and the operations that represent the data that can be retrieved from a GraphQL API from various backend data sources. This is generally a time consuming process for an API developer requiring considerable manual effort on the part of the developer to accurately define the object types and object fields that represent data that can be retrieved from the API using a schema definition language. Certain approaches used by existing GraphQL API development techniques perform introspection (or inspection) of the datasources to determine structural information associated with the datasources to enable faster GraphQL API development. However, existing introspection techniques do not allow developers to intricately choose the objects and the fields in those objects along with the operations allowed on them during the GraphQL API development process. Also, existing techniques that may perform introspection do not have capabilities to introspect different types of backend datasources, such as for instance, relational databases, Representational State Transfer (REST) API datasources and so on.

The present disclosure addresses several deficiencies of systems that perform GraphQL API development. A GraphQL Application Programing Interface (API) schema design system is disclosed that enables the creation of a GraphQL API schema by introspecting various types of backend datasources. The backend datasources may include, but are not limited to, relational databases, REST APIs, graph databases, micro-services, web services and so on. In certain examples, the introspection is facilitated using a set of introspection User Interface (UI) screens that provide users with the ability to select and introspect a backend datasource and to select individual elements of the datasource to be included in the creation of a GraphQL API schema. Using the introspection UI screens provided by the disclosed system, users can easily create a GraphQL API schema without having to explicitly define a schema using a schema specification language.

In certain embodiments, after generating a GraphQL API schema comprising object types, object fields and operations as described above, the disclosed system additionally includes capabilities to generate filter input object types for the object types defined in the GraphQL API schema. The filter input objects are also generated by the system using data source introspection as described above. The filter input objects provide the ability for a GraphQL API user (i.e., an API developer or an end user) to perform simple filtering operations as well complex filtering operations on a query operation executed on a schema object defined in the GraphQL API schema. Using the filter input object, a GraphQL user can construct filtering arguments that can be applied to various different backend datasources such as REST APIs, relational databases and so on.

In certain examples, the filter input object provides the ability for a GraphQL API user to create expression structures as filter arguments in a query operation executed on a schema object. Using the expression structures, a user can perform complex filtering operations in the query operation against various different backend datasources. The filter input object is customizable according to the backend data source supported by the object types defined in the schema. For example, REST APIs only allow certain basic filters while listing a set of resources. These filters are simple and include the filtering of resources based on attributes in the resource or a combination of attributes (i.e., an 'AND' operation). In the case of a relational database, the support for filtering becomes more complex since an SQL "where" clause can be used to perform complex queries on a table or a set of tables. Using the filter input object designed by the disclosed system, a GraphQL user can construct filtering arguments that can be applied to various different backend datasources such as REST APIs, relational databases and so on. The disclosed filter input object design is thus extensible to different types of backend data sources and can be customized according to the data source backed by the object type defined in the GraphQL schema.

By using the disclosed system, a user can easily create a GraphQL API schema using introspection without having knowledge of any particular schema specification language (e.g., SDL)) to explicitly define a schema or without explicitly having to write the code/logic to create resolver functions for the object types defined in the schema. The datasource introspection UI based, metadata driven, codeless implementation provided by the disclosed system to generate a schema enables even non-developers (e.g., novice users) to be able to easily create GraphQL APIs without having to explicitly write a GraphQL API schema using a SDL, without knowing details of how schema maps to resolvers and without knowing details of how the data is fetched from the data sources.

In certain examples, the disclosed system includes capabilities to perform database introspection. The database introspection not only allows the selection of individual database tables as schema objects but also the selection of individual columns of a table as fields of schema objects represented in a GraphQL API schema as well as operations allowed on the schema objects. The system additionally includes capabilities to perform REST API introspection, where users can inspect (i.e., introspect) an open API specification of a REST API datasource and choose APIs and resources with the needed fields that need to be exposed as objects and operations in the GraphQL schema. Thus, a user of the system is able to create objects from a combination of backend datasources such as relational databases, REST API datasources (REST services) and so on and make the objects available for querying in a GraphQL schema.

FIG. 1 depicts an example of a computing environment 100 that includes a GraphQL Application Programing Interface (API) schema design system 102 for creating a GraphQL API schema, according to certain embodiments. Processing related to creating a GraphQL API schema may be performed by one or more subsystems (e.g., the schema introspection subsystem 104, the schema generation subsystem 106 and the filter object design subsystem 107) within the GraphQL schema design system 102. The systems and subsystems of the system 102 depicted in FIG. 1 may be implemented using software (e.g., code, instructions, program) executed by one or more processing units (e.g., processors, cores), hardware, or combinations thereof. The software may be stored on a non-transitory storage medium (e.g., on a memory device).

The system 102 may be implemented in various different configurations. In certain embodiments, the system 102 may be implemented within an enterprise (e.g., an organization) servicing users of the enterprise. For instance, users of an enterprise may utilize the functionality of the system 102 to create a GraphQL API schema using datasource introspection and create resolver functions for object types and object fields represented in the schema. In some other embodiments, the system 102 may be implemented on one or more servers of a cloud service provider (CSP) and its schema and resolver function creation functionality may be provided to subscribers (e.g., an organization or an enterprise) who subscribe to cloud services on a subscription basis.

The computing environment 100 additionally includes a GraphQL server 120 for executing GraphQL queries against a GraphQL API schema generated by the GraphQL API schema design system 102 to retrieve data from one or more backend datasources. The backend datasources (108A-108N) may include, but are not limited to, relational databases, REST APIs, graph databases, micro-services, web services and so on. The GraphQL server 120 may be implemented in various different configurations. In certain embodiments, the GraphQL server 120 may be implemented within the enterprise (organization) servicing users of the enterprise. For instance, users of an enterprise may utilize the functionality of the GraphQL server to execute queries against a GraphQL API schema generated by the GraphQL API schema design system 102. In other embodiments, the GraphQL server 120 may be implemented on a cloud service provider (CSP) and its query execution functionality may be provided to subscribers (e.g., an organization or an enterprise) who subscribe to cloud services on a subscription basis.

The computing environment 100 depicted in FIG. 1 is merely an example and is not intended to unduly limit the scope of claimed embodiments. One of ordinary skill in the art would recognize many possible variations, alternatives, and modifications. For example, in some implementations, the GraphQL API schema design system 102 and the GraphQL server 120 can be implemented using more or fewer subsystems than those shown in FIG. 1, may combine two or more subsystems, or may have a different configuration or arrangement of subsystems.

In certain embodiments, the processing related to creating/generating a GraphQL schema is performed by one or more subsystems (104, 106, 107) of the GraphQL API schema design system 102. The processing first involves, introspecting, by the schema introspection subsystem 104, a type of backend datasource to determine structural information (i.e., a set of individual elements) associated with the backend datasource. For instance, the introspection of a backend datasource such as a database, involves determining, by the schema introspection system, individual elements associated with the database such as the tables, columns, and a set of operations that can be supported by the tables and the columns within the database. In a certain implementation, the introspection is facilitated using one or more datasource introspection User Interface (UI) screens of the schema introspection subsystem 104. Using the datasource introspection screens, a user (e.g., an API developer 118) of the system 102 can select a type of datasource to introspect and select individual elements associated with the selected datasource to introspect. For instance, for a datasource type that represents a database, a user may select tables within the database, select individual columns of the table as well as select operations that can be performed on the selected tables and/or selected columns of the table using the datasource introspection screens.

Once introspection is complete, the schema generation subsystem 106 creates (or generates) a GraphQL API schema based on the selected elements associated with the selected datasource type. For instance, for a database, the schema generation subsystem 106 represents (or exposes) the selected tables of the database as a set of object types in the GraphQL API schema, the selected columns associated with the selected tables as a set of object fields associated with the set of object types and the selected operations as queries or mutations that are supported by the object types in the GraphQL API schema. The schema generation subsystem additionally creates resolver functions for the objects, object fields and/or operations defined in the GraphQL API schema. Details of the processing performed by the schema generation subsystem 106 to generate a schema and generate resolver functions for the objects defined in the schema is described in detail below.

In certain examples, a user (e.g., an API developer 118) of the system 102 may interact with the system 102 using a GraphQL schema design UI 112 associated with the GraphQL schema design system 102 to create a GraphQL API schema. As depicted in FIG. 1, the GraphQL schema design UI may be displayed via a computing device 110 that is communicatively coupled to the system 102, possibly via one or more communication networks. The computing device 110 may be of various types, including but not limited to, a mobile phone, a tablet, a desktop computer, and the like. The GraphQL schema design UI 112 may be composed of one more UIs such as a schema introspection UI 114 and a schema generator/schema editor UI 116. Using the schema introspection UI 114, an API developer 118 can select elements associated with a particular datasource type. For example, for a datasource type that represents a relational database, the schema introspection UI 114 displays the tables, columns and the operations that can be executed on those tables and columns and further provides a developer with the ability to pick and choose the relevant tables and their columns as GraphQL schema objects and schema fields along with the operations that can be executed on those objects.

Once introspection is complete, the schema generation subsystem 106 generates the GraphQL API schema, and the schema is published and presented to the API developer via the schema generator/editor UI 116. In certain examples, the API developer 118 may further use the Schema Generator/schema Editor UI to modify the generated schema and the resolver functions that are responsible for resolving (returning) the data for object fields defined in the schema. Details related to the processing performed by the various systems and subsystems in FIG. 1 as well as details related to the functionality provided by the schema introspection UI 114 and the schema generator/schema editor UI 116 are described below with respect to the flowchart depicted in FIG. 2 and its accompanying description.

The published GraphQL API schema 122 and the resolver functions 124 may be provided to a GraphQL server 120 for processing. As depicted in FIG. 1, the GraphQL server 120 receives a GraphQL query 130 from an end user 126 and executes the GraphQL query against the GraphQL API schema 122 and the resolver functions 124 to retrieve results for the end user. The end user (e.g., 118) may be an API developer or a non-API developer of an entity (e.g., organization) that implements the functionality provided by the systems 102 and 120. In certain examples, the end user 126 may utilize an application UI 128 associated with a client device 124 to submit a GraphQL query 130. The system 120 checks the query 130 against the GraphQL API schema 122 and the resolver functions 124 to ensure that the query refers to the types and fields defined in the schema and then executes the query against one or more backend datasources (108A-108N) to produce a query result. The query result 132 is provided to the end user via the application UI of the device 128.

Using the introspection UIs and the schema generator UIs provided by the system 120, a user can easily create a GraphQL API schema without having knowledge of any particular schema specification language (e.g., SDL)) to explicitly define a schema and to explicitly write the code/logic to create resolver functions for the object types defined in the schema. Non-API developers (e.g., novice users) can also create a GraphQL API using the introspection techniques provided by the system 102 without having to know the details of how a schema maps to the resolvers and how the data is fetched from the backend datasources.

The disclosed system additionally provides users with the ability to introspect different types of backend datasources, including, but not limited to, relational databases, REST APIs, graph databases, micro-services, web services and so on. The database introspection not only allows selection of individual database tables as schema objects but also the selection of individual columns of a table as fields of schema objects represented in a GraphQL API schema as well as operations allowed on the schema objects. The system additionally includes capabilities to perform REST API introspection, where users can inspect (i.e., introspect) an open API specification of a REST service and choose APIs and resources with the needed fields that need to be exposed as objects and operations in the GraphQL schema. Thus, a user of the system 102 is able to create objects from a combination of backend datasources such as relational databases, REST services and so on and make the objects available for querying in a GraphQL schema.

Figure 2:
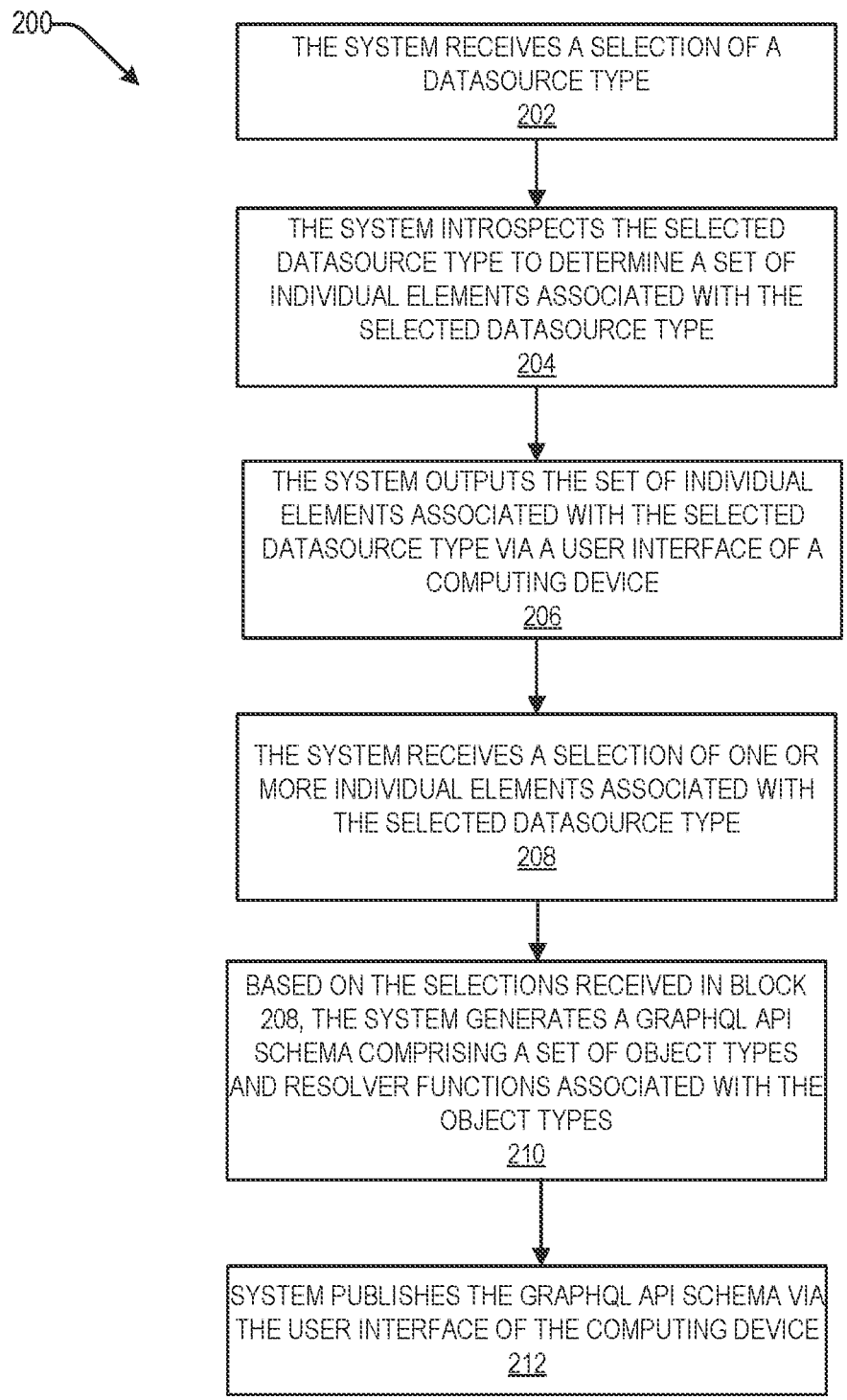
FIG. 2 depicts an example of a process for generating a GraphQL API schema, according to certain embodiments.

FIG. 2 depicts an example of a process 200 for generating a GraphQL API schema, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by the schema introspection subsystem 104 and the schema generation subsystem 106 of the GraphQL API schema design system 102.

At 202, processing is initiated when the schema introspection subsystem 104 receives a selection of a datasource type from a user (e.g., an API developer 118 shown in FIG. 1) of the system 102 to create a GraphQL API schema. For example, in the embodiment depicted in FIG. 1, the API developer 118 may select a particular datasource type via the schema introspection UI 114 of the computing device 110. The types of datasources that may be selected may include, but are not limited to, relational databases, REST APIs, graph databases, micro-services, web services and so on. An example of a schema introspection UI for selecting a datasource type is shown in FIG. 3.

Figure 3:
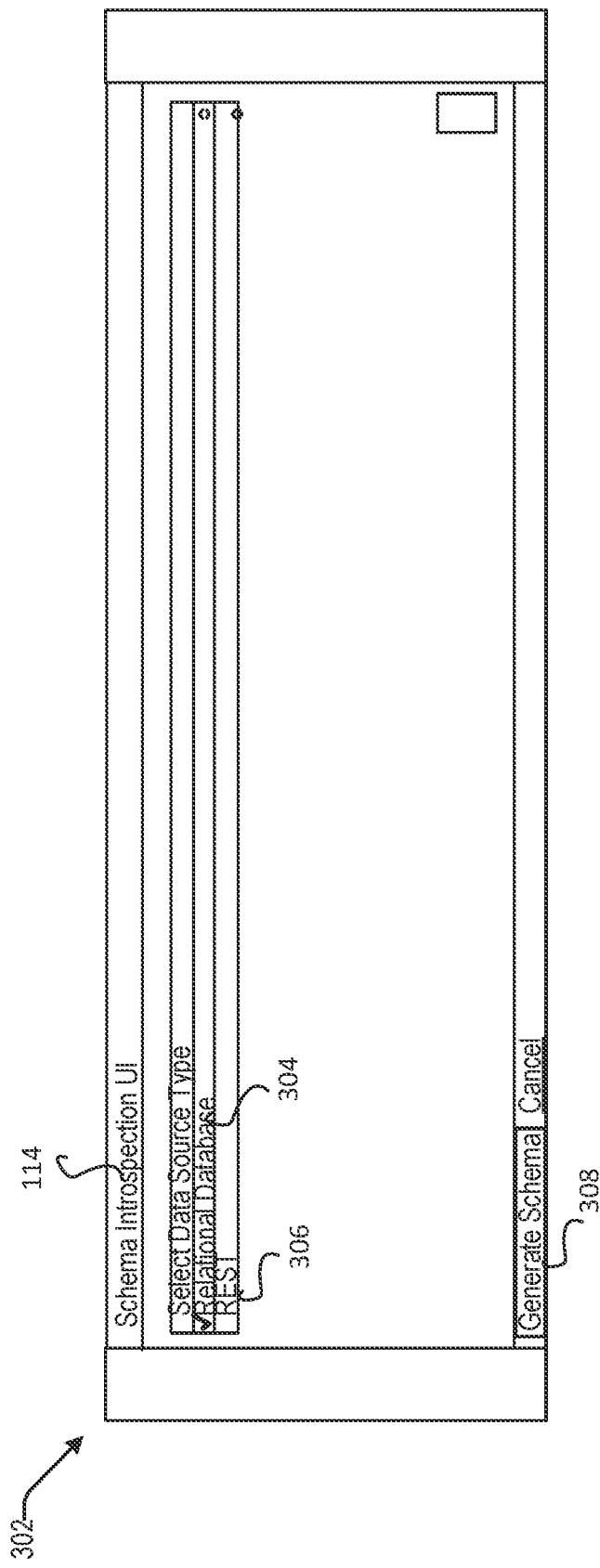
FIG. 3 depicts an example of a graphical user interface (GUI) for selecting a datasource type, according to certain embodiments.

FIG. 3 depicts an example of a graphical user interface (GUI) 302 for selecting a datasource type, according to certain embodiments. In certain examples, the GUI 302 may be a UI component of the schema introspection UI 114 that is provided to an API developer (e.g., 118) as part of the schema introspection workflow. As shown in FIG. 3, in certain examples, an API developer may select a particular datasource type (e.g., a Relational Database 304) via the UI to create a GraphQL API schema. In other examples, the API developer may select a different datasource type (e.g., a REST datasource 306) via the GUI 302. After selecting a particular datasource type via the GUI 302 depicted in FIG. 3, the API developer may select the "generate schema" button 306 to execute the select operation.

At block 204, the schema introspection system 104 introspects the selected datasource type to determine a set of individual elements associated with the selected datasource type. By way of example, the individual elements for a datasource type that is a database, may include, for instance, tables and columns associated with the database and a set of operations that can be performed on the tables and columns.

At block 206, the schema introspection system 104 outputs the individual elements associated with the selected datasource type via a UI of a computing device. For example, in the embodiment depicted in FIG. 1, the elements associated with a selected datasource type may be output/displayed to the API developer 118 via the schema introspection UI 114 of the computing device 110. An example of a UI for outputting individual elements associated with a selected datasource type is shown in FIG. 4.

Figure 4:
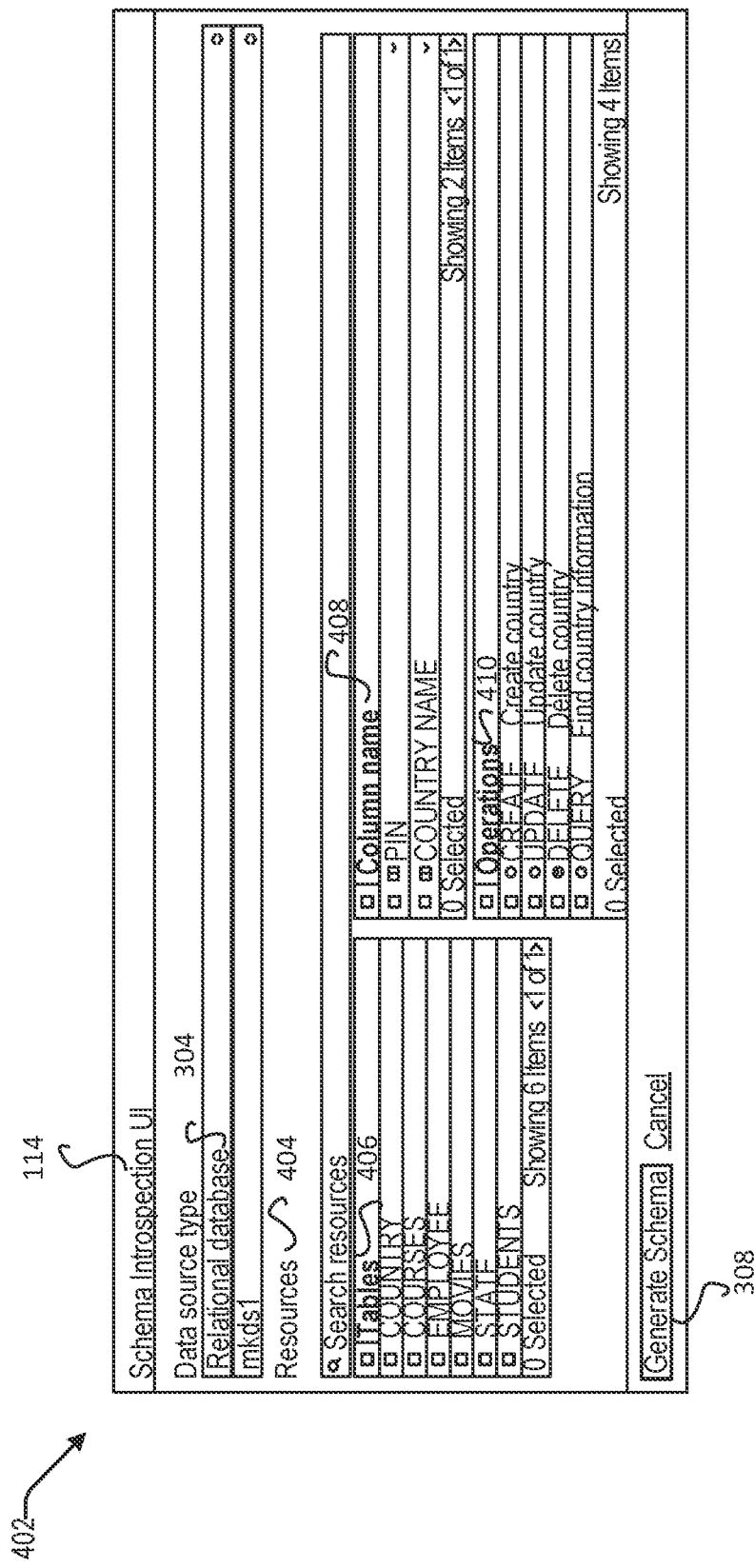
FIG. 4 depicts an example of a graphical user interface (GUI) for outputting individual elements associated with a selected datasource type, according to certain embodiments.

FIG. 4 depicts an example of a graphical user interface (GUI) 402 for outputting individual elements associated with a selected datasource type, according to certain embodiments. In certain examples, the GUI 402 may be provided as a UI component of the schema introspection UI to an API developer (e.g., 118) as part of the schema introspection workflow. As shown in FIG. 4, the individual elements (also referred to herein as "resources" 404 in FIG. 4) associated with a selected datasource type (i.e., relational database "mkdsl" 304) comprises a set of tables 406 within the database, for a table, a set of columns 408 of the table and a set of operations 410 that can be supported by the table and/or the columns of the table. In the illustrated example, the UI 402 displays a set of columns (e.g., a pin, country name) and a set of Create, Read, Update and Query operations (e.g., create country, update country, delete country, find country information) that can be supported by a particular table (e.g., country) selected by the API developer. In other examples, based on the developer's selection, the UI 404 may display columns associated with another table (e.g., courses, employee, movies, state or student) of the relational database via the GUI 402 and a set of operations supported by that table.

At block 208, the schema introspection subsystem 104 receives a selection of one or more individual elements associated with the selected datasource type. For instance, the selected elements for a relational database may include, for instance, one or more tables of the database, one or more columns associated with a selected table of the database and/or one or more operations that can be supported by the selected table and/or one or more selected columns of the table. For example, in the embodiment depicted in FIG. 1, the elements associated with a selected datasource type may be selected by the API developer 118 via the schema introspection UI 114 of the computing device 110. An example of a UI for selecting elements associated with a selected datasource type is shown in FIG. 5.

Figure 5:
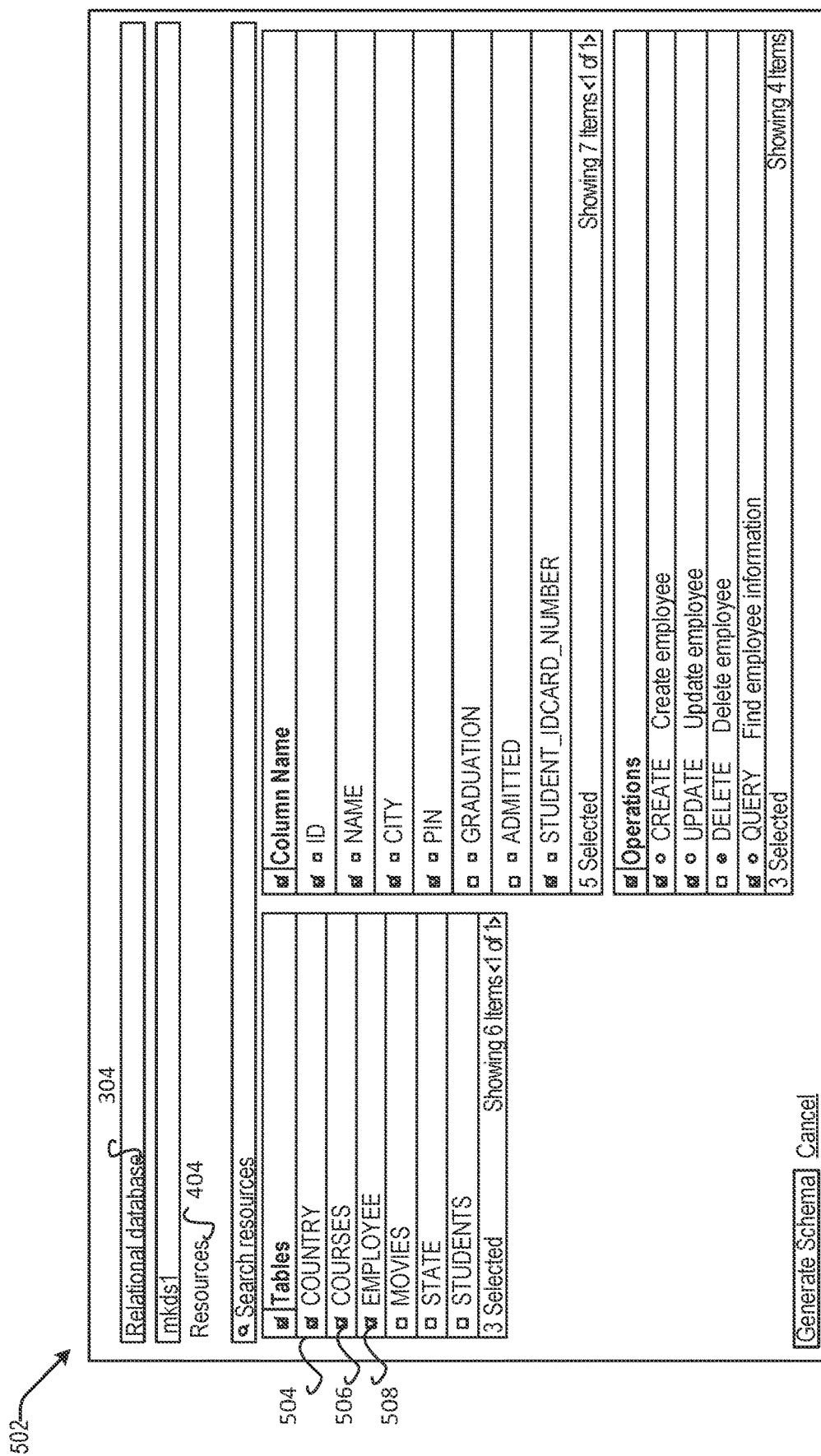
FIG. 5 depicts an example of a graphical user interface (GUI) for selecting one or more elements associated with a selected datasource type, according to certain embodiments.

FIG. 5 depicts an example of a graphical user interface (GUI) 502 for selecting one or more elements associated with a selected datasource type, according to certain embodiments. In certain examples, the GUI 502 may be presented as a UI component of the schema introspection UI to an API developer (e.g., 118) as part of the schema introspection workflow. As shown in FIG. 5, the selectable elements (i.e., resources) associated with a selected datasource type (i.e., relational database 304) may include a set of tables within the relational database that can be selected, for each selected table, the columns of the table that can be selected and a set of selectable operations that are supported by the table and/or the columns of the table. The UI 502 shown in FIG. 5 illustrates that three tables, country 504, courses 506 and employee 508 of the relational database 304 "mkDS1" have been selected. In other examples, a different set of one or more tables of the relational database may be selected. The UI 502 additionally displays a set of columns for a selected table and a set of operations that are supported by the selected table. Once all selections have been made for all the selected tables, the API developer may select the "Generate Schema" button 308 to execute the selections.

In block 210, the system generates a GraphQL API schema based on the selections received in block 208. In certain examples, such as in the embodiment depicted in FIG. 1, the schema generation subsystem 106 generates the GraphQL API schema based on the selected elements associated with the selected datasource type. For instance, as previously described, for a database, the selected elements may include selected tables, selected columns within the selected tables and one or more selected operations supported by the selected tables. To generate a GraphQL API schema for a database datasource type, the schema generation subsystem 106 represents (or exposes) the selected tables as a set of object types in the GraphQL API schema, the selected columns associated with the selected tables as a set of object fields associated with the set of object types and the selected operations as queries or mutations that are supported by the object types represented in the GraphQL API schema. Once the GraphQL schema is generated, the schema generation subsystem 106 additionally generates the resolver functions for the objects, object fields and/or operations defined in the schema. In certain examples, such as in the embodiment depicted in FIG. 1, the GraphQL API schema may be displayed via a schema generator/schema editor 116 of the computing device 110.

FIG. 6 depicts an example of a graphical user interface (GUI) 602 for presenting a GraphQL API schema, according to certain embodiments. In certain examples, the GUI 602 may be a UI component of the schema generator/schema editor UI 116 and presented to a user (e.g., an API developer) of the system 102 as part of the schema generation workflow performed by the schema generation subsystem 106. As shown in FIG. 6, the GraphQL API schema 604 comprises a set of object types (country type 606, courses type 608 and employee type 610) and a set of object fields associated with the set of object types. The "country" object type 606 in the schema 604 is generated based on the "country" table 504 selected via the GUI 502 shown in FIG. 5 and the set of object fields of the "country" object type are generated based on the columns ("countryname" and "pin") of the "country" table that were selected via the GUI 502. Similarly, the "courses" object type 608 in the schema 604 is generated based on the "courses" table 506 selected via the GUI 502 and the set of object fields of the "courses" object type are generated based on a set of columns of the table 506 that were selected via the GUI 502. The "employee" object type 610 in the schema 604 is generated based on the "employee" table 508 selected via the GUI 502 and the set of object fields of the "employee" object type are generated based on a set of columns of the table 508 that were selected via the GUI 502.

In certain examples, the GraphQL API schema 604 may be composed of additional object types (e.g., Query types, Mutation types) that represent a set of operations (e.g., queries and mutations) that can be supported by one or more object types (e.g., 606, 608 or 610) defined in the GraphQL API schema. FIG. 7 depicts an example of a graphical user interface (GUI) 702 comprising GraphQL mutation types and GraphQL query types defined in a GraphQL API schema, according to certain embodiments. In certain examples, the GUI 702 may be a UI component of the schema generator/schema editor UI 116 and presented to an API developer (e.g., 118) as part of the schema generation workflow performed by the schema generation subsystem

106. A GraphQL query type 706 is used to represent a set of operations in a GraphQL schema 604 that can be sent to a GraphQL server to fetch data from one or more backend data sources. For example, in the example shown in FIG. 7, "getCountry(pin: ID!) Country" 708 is a query type operation defined in the GraphQL API schema that is used to fetch a pin code associated with the country object type from a backend datasource. A GraphQL mutation type 704 represents a set of operations that can be sent to a GraphQL server to modify (create, update or delete) data at the backend data sources. For instance, createCountry (input: CountryInput): Country 710 is a mutation type operation defined in the GraphQL API schema that can be used to create a new country object type.

GraphQL API Schema Filter Input Object Design

After a GraphQL API schema has been generated with object types, query types and mutation types, as described above, in certain embodiments, the GraphQL API schema design system 102 may be configured to generate filter input object types for the object types defined in the GraphQL API schema. In a certain implementation, the filter object design subsystem 107 in the system 102 includes capabilities to generate filter input object types for the object types defined in a GraphQL API schema. The filter input objects are generated by the system using data source introspection as described above. The filter input objects provide the ability for a GraphQL API user (i.e., an API developer or an end user) to perform simple filtering operations as well complex filtering operations on a query operation executed on a schema object defined in the GraphQL API schema. Using the filter input object, a GraphQL user can construct filtering arguments that can be applied to various different backend datasources such as REST APIs, relational databases and so on.

The filter input object generated by the filter object design subsystem 107 has a similar structure (design) as a regular schema object type defined in the GraphQL API schema. The filter input object structure is composed of different fields including fields that return object types including the parent object itself. In certain examples, the filter input object provides the ability for a GraphQL API user to create expression structures as filter arguments in a query operation executed on a schema object. Using the expression structures, a user can perform complex filtering operations in the query operation against various different backend datasources. The filter input object is customizable according to the backend data source supported by the object types defined in the schema. For example, REST APIs only allow certain basic filters while listing a set of resources. These filters are simple and include the filtering of resources based on attributes in the resource or a combination of attributes (i.e., an 'AND' operation). In the case of a relational database, the support for filtering becomes more complex since an SQL "where" clause can be used to perform complex queries on a table or a set of tables. Using the filter input object designed by the disclosed system, a GraphQL user can construct filtering arguments that can be applied to various different backend datasources such as REST APIs, relational databases and so on. The disclosed filter input object design is thus extensible to different types of backend data sources and can be customized according to the data source backed by the object type defined in the GraphQL schema. Additional details of the implementation of the structure of the filter input object and the use of the filter input object to perform simple as well as complex filtering operations in the query operation against various different backend datasources is described in relation to FIGS. 8-15 below.

Figure 8:
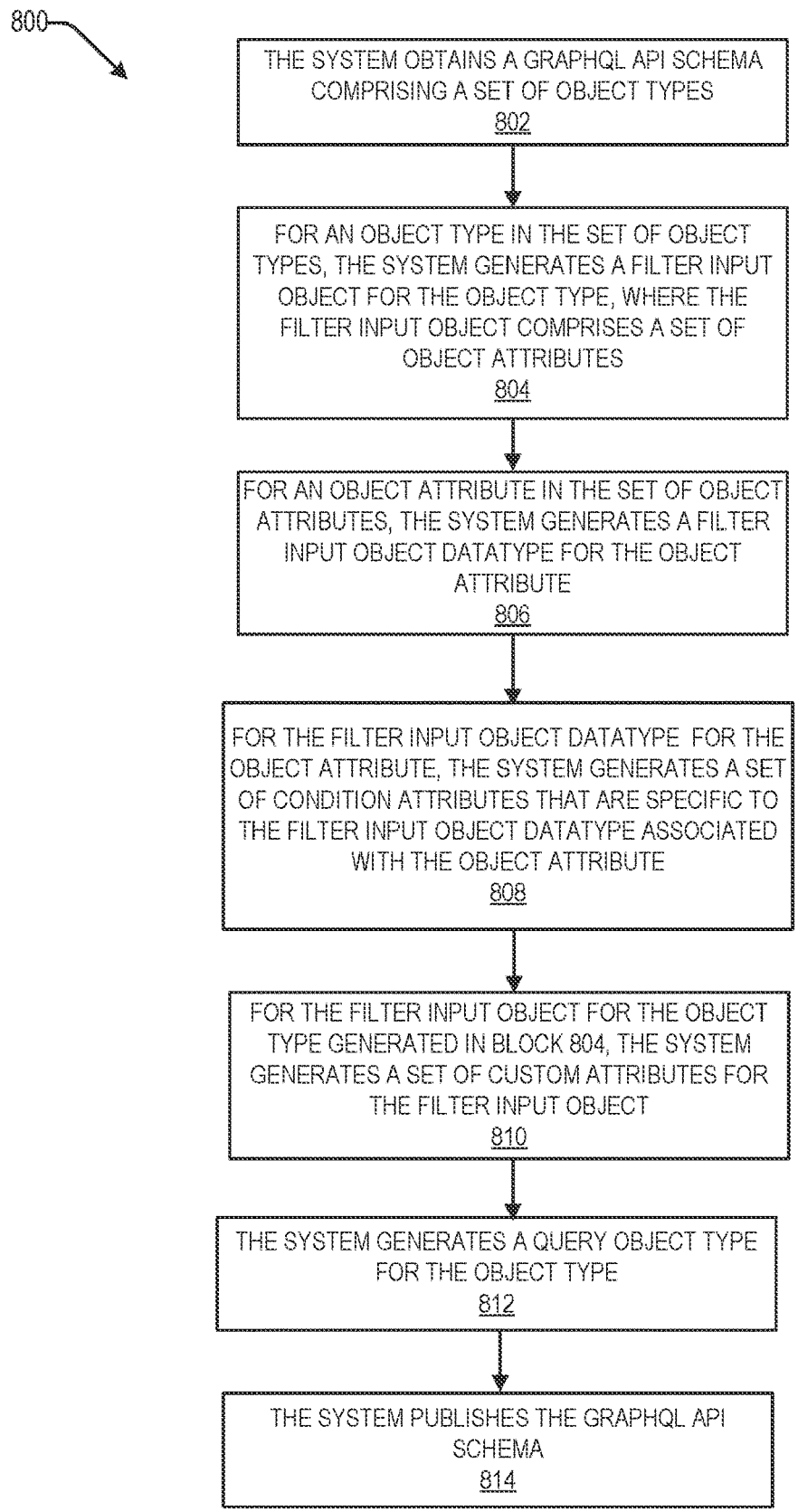
FIG. 8 depicts an example of a process for generating a filter input object type for an object type defined in a GraphQL API schema, according to certain embodiments.

FIG. 8 depicts an example of a process for generating a filter input object type for an object type defined in a GraphQL API schema, according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 800 presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 8 may be performed by the filter object design subsystem 107 in the schema generation subsystem 106 of the GraphQL API schema design system 102 as part of the schema generation workflow. In particular, the processing described in FIG. 8 describes the generation of a filter input object for an object type defined in a GraphQL schema by the filter input object subsystem 107.

In block 802, as part of the schema generation workflow, the filter design subsystem obtains (accesses) a GraphQL API schema (e.g., 604 shown in FIG. 6, FIG. 7) generated by the schema generation subsystem 106. As previously described, the GraphQL API schema may comprise a set of one or more object types. An object type comprises a set of fields associated with the object type. The GraphQL API schema 604 may additionally comprise queries and mutations that are available for end users to execute.

At block 804, the filter design subsystem 107 generates a filter input object for an object type defined in the GraphQL API schema. The filter input object comprises different attributes that return object types including the parent object itself. As will be described in greater detail below, the filter input object provides the ability for a GraphQL API user to pass in relevant filter arguments that can be used to perform simple filtering operations as well as complex filtering operations. An example implementation of a filter input object generated for an object type defined in a GraphQL API schema is depicted in FIG. 9.

FIG. 9 depicts an example of a filter input object generated for an object type defined in a GraphQL API schema, according to certain embodiments. In certain examples, the GUI 902 may be a UI component of the schema generator/schema editor UI 116 and presented to a user (e.g., an API developer) of the system 102 as part of the schema generation workflow by the filter object design subsystem 107. In the example shown in FIG. 9, the GraphQL API schema 604 comprises an object type "Post" 906 that comprises a set of fields (id, title, desc, hits, rating). The schema 604 additionally comprises a filter input object (e.g., PostFilterInput) 908 that is generated for the object type (Post). In a certain implementation, the filter input object 908 is generated by the filter object design subsystem 107 as part of the schema generation process. The filter input object 908 comprises a set of object attributes. Each object attribute in the set of object attributes corresponds to a field associated with the object type. For instance, for the "PostFilterInput" object 908 depicted in the schema, the set of object attributes associated with the PostFilterInput represent a set of fields (id, title, desc, hits, rating) of the object type (Post).

At block 806, the filter design subsystem 107 generates a filter input object datatype for an object attribute in the set of object attributes defined for the filter input object. The filter input object datatype that is generated for the object attribute is specific to a datatype of the field of the object type that corresponds to the object attribute. For instance, as shown in the UI of FIG. 9, the "hits" object attribute in the filter input object 908 corresponds to the "hits" field of the object type (Post). Since the "hits" field supports integer datatype values, the filter input object datatype that is generated for the "hits" object attribute in the filter input object is an "IntFilterInput" object. Additional types of filter input object datatypes that may generated for the object attributes of a filter input object may include, for instance, a "StringFilterInput" object (that is specific to a field of the object type that supports string values), an "IDFilterInput" object (that is specific to a field of the object type that supports ID (int) values) and so on.

At block 808, the filter design subsystem 107 generates a set of condition attributes for the filter input object datatype generated for the object attribute in block 806. The set of condition attributes are specific to the filter input object datatype associated with the object attribute. An example implementation of a filter input object datatype generated for an object attribute in a filter input object defined in a GraphQL API schema is depicted in FIG. 10.

FIG. 10 depicts an example of a filter input object datatype generated for an object attribute in a filter input object defined in a GraphQL API schema, according to certain embodiments. In certain examples, the GUI 1002 may be a UI component of the schema generator/schema editor UI 116 and presented to a user (e.g., an API developer) of the system 102 as part of the schema generation workflow by the filter object design subsystem 107. In the GraphQL API schema 604 shown in FIG. 10, the "IntFilterInput" object 1008 represents a filter input object datatype generated for object attributes ("hits," "rating") in the filter input object (PostFilterInput) 908 defined in the GraphQL API schema. The "IntFilterInput" object 1008 is associated with a set of condition attributes that are specific to the filter input object datatype associated with the object attribute. A condition attribute identifies a condition that can be applied to an object attribute associated with the filter input object. The condition attribute additionally identifies the datatype values that are supported by the condition. For instance, the set of condition attributes for the "IntFilterInput" object identify a set of conditions, such as, not equal to (_ne), "equal to" (_eq), "less than," (le), "greater than," (ge) and so on that can be applied to different object attributes of the filter input object. Each condition is associated with an Integer (Int) datatype that represents the datatype values supported by the condition. Additionally, in certain examples, a filter input object datatype generated for an object attribute can also include one or more nested filter input object datatypes. For instance, the condition attribute (_between) in the "IntFilterInput" object 1008 can reference another filter input object datatype ("IntBetweenInput") 1010 which in turn is defined by a set of condition attributes (_floor, _ceiling).

FIG. 11 depicts additional examples of filter input object datatypes generated for object attributes in a filter input object defined in a GraphQL API schema, according to certain embodiments. In the GraphQL API schema 604 shown in FIG. 11, the "StringFilterInput" object 1104 represents a filter input object datatype generated for the object attributes ("title," "desc") in the filter input object (PostFilterInput) 908 defined in the GraphQL API schema. The "StringFilterInput" object 1104 is associated with a set of condition attributes that are specific to the filter input object datatype associated with the object attribute. For instance, the set of condition attributes for the "StringFilterInput" object identify a set of conditions, such as, not equal to (_ne), "equal to" (_eq), "less than," (le), "greater than," (ge) and so on that can be applied to different object attributes of the filter input object. Each condition is associated with a string datatype that represents the datatype values supported by the condition. Additionally, in certain examples, the "StringFilterInput" object 1104 can also include one or more nested filter input object datatypes and a Boolean datatype. For instance, the condition attribute (_between) in the "StringFilterInput" object 1104 references another filter input object datatype ("StringBetweenInput") which in turn can be defined by its own set of condition attributes.

The GraphQL API schema 604 shown in FIG. 11 additionally illustrates an "IDFilterInput" object 1108. The "IDFilterInput" object 1108 represents a filter input object datatype generated for the object attribute ("id) in the filter input object (PostFilterInput) 908 defined in the GraphQL API schema. The "IDFilterInput" object 1108 is associated with a set of condition attributes that are specific to the filter input object datatype associated with the object attribute. The "IDFilterInput" object 1108 also includes a nested filter input object datatype, "IDBetweenInput," 1106 that is defined by its own set of condition attributes.

Returning to the discussion of the processing performed by the filter design subsystem 107, at block 810, the filter design subsystem 107 generates a set of custom attributes (also referred to herein as reserved attributes) for the filter input object 908. FIG. 9 illustrates examples of different types of custom attributes that are generated for a filter input object 908 defined in the GraphQL API schema. By way of example, the custom attributes may include a logical operator attribute (_operator) 910, an expression attribute (_expr) 912, and a negation operator attribute(not) 914. The custom attributes provide the ability for an API developer (or an end user) to perform complex filtering operations in a query operation executed on the object type.

In a certain implementation, the expression attribute 912 references an array of elements, where each element is a filter input object. The expression attribute enables a GraphQL API user to create one or more expression structures in filter arguments of a query operation executed on a schema object. The expression structures may be additionally combined using the logical operator attribute and the negation operator attribute to perform complex filtering operations in the query operation against various different backend datasources.

At block 812, the filter design subsystem generates a query object type (Query) for the object type (Post). The query object type (e.g., 906 shown in FIG. 9) identifies the query operation (listPosts) to be performed on the object type (Post). The query operation (listPosts) comprises a filter input variable (also referred to herein as a filter argument or a filter function), "filter" that is used to perform filtering operations on one or more object attributes of the filter input object. In a certain implementation, the filter input variable (filter) specifies an input argument that identifies the filter input object (PostFilterInput) associated with the object type (Post). The filter function (filter) enables users to pass in filter arguments that can be used to perform simple filtering operations as well complex filtering operations on a query operation executed on a schema object defined in the GraphQL API schema. Additionally, using the filter function, users can create expression structures (using the expression attribute) to perform complex filtering operations on a query operation. Examples of the various types of simple and complex filtering operations that can be performed in a query operation using the filter function are described in detail below.

After the GraphQL API schema has been generated as described above, as part of the schema generation workflow, the schema generation subsystem 106 and/or the filter design subsystem 107 additionally include capabilities to create/generate a set of resolver functions to fetch data for the object fields associated with different schema types (object, query or mutation) defined in the schema from various different backend datasources. A resolver function populates data for a particular object field in a GraphQL API schema. In a certain implementation, the generation of a resolver function for an object field defined in the schema, involves, generating resolver metadata (i.e., a resolver query) to fetch data (i.e., resolve a value) for the object field from various backend sources. The resolver metadata may include, for example, the return value of the object field to be fetched from the backend datasource, the arguments provided for the object field, information pertaining to the data type to be returned, context information regarding the object type associated with the object field, information regarding query/mutation operations defined by the object field and so on.

As previously described, the backend datasources may be any database (e.g., SQL, no-SQL), a REST API, a graph database, a micro-service, a web service, and so on that stores or provides the data to populate the schema's object fields. For instance, referring to the GraphQL API schema 604 shown in FIG. 6, the schema generation subsystem 106 may create a resolver function to retrieve a pin code (object field) for a country (object type), to obtain an employee id for an employee, to obtain a course id for a course and so on. A resolver function returns data from a particular backend datasource of the type required by the resolver's corresponding schema object field (e.g., a string, an integer, an object etc.).

At block 814, the filter design subsystem 107 provides/publishes the GraphQL API schema comprising the object types, filter input objects, filter input object datatypes, query types, and mutations via a user interface of the computing device. In certain examples, such as in the embodiment depicted in FIG. 1, the filter design subsystem 107 publishes the GraphQL API schema 122 and a set of resolver functions 124 defined for the object types in the schema via the schema generator/schema editor UI 116 of the GraphQL schema design UI 112. For example, to publish the generated GraphQL API schema 122, an API developer may select the "save" button 612 (e.g., as shown in GUI 602) to execute the publish operation. The filter design subsystem 107 provides the published GraphQL API schema 122 and the set of resolver functions 124 to a GraphQL server (e.g., 120). The GraphQL server 120 uses the GraphQL API schema 122 and the resolver functions 124 to parse and validate an incoming GraphQL query request from an end user (e.g., 128), identify the operation (e.g., a query or a mutation) to execute and execute the operation against one or more backend data sources (e.g., 108A-108N) to return the results of the operation to the end user.

GraphQL Query Execution

Figure 12:
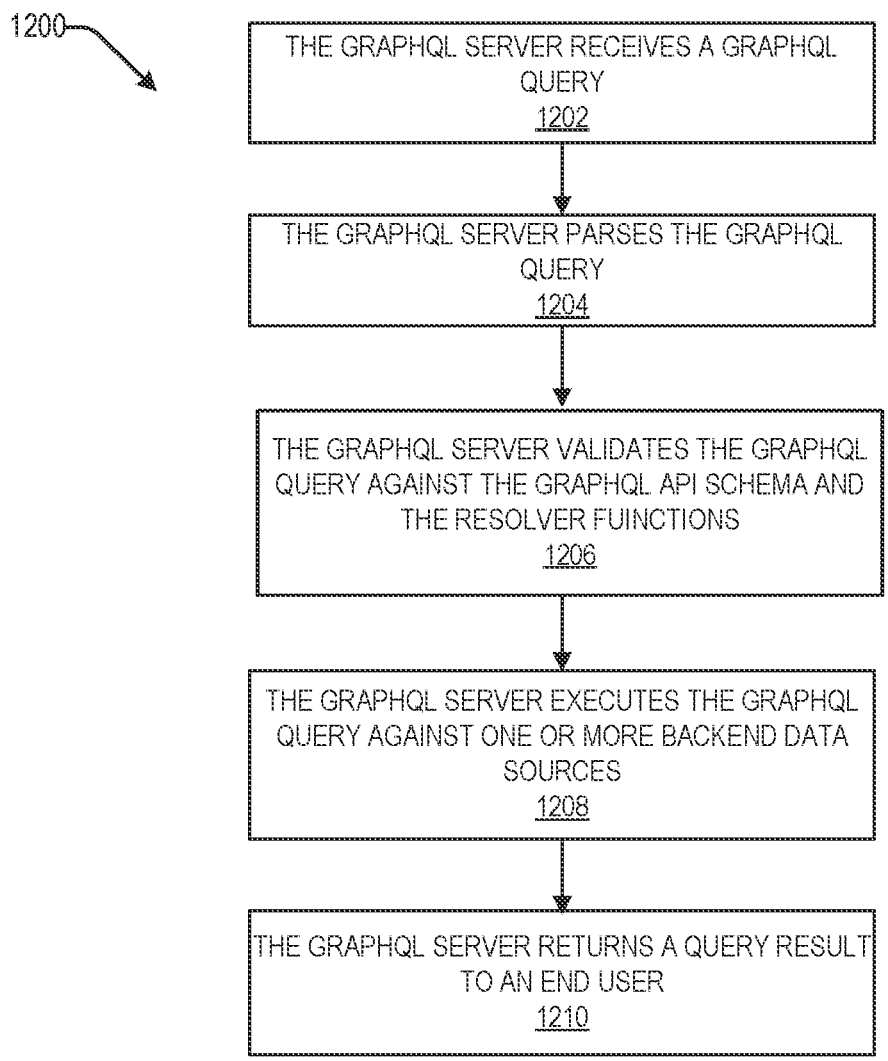
FIG. 12 depicts an example of a process performed by a GraphQL server for executing a GraphQL query, according to certain embodiments.

FIG. 12 depicts an example of a process 1200 performed by a GraphQL server for executing a GraphQL query, according to certain embodiments. The processing depicted in FIG. 12 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 1200 presented in FIG. 12 and described below is intended to be illustrative and non-limiting. Although FIG. 12 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 12 may be performed by the GraphQL server 120.

At 1202, processing is initiated when the GraphQL server 120 receives a query request (GraphQL query 130) from an end user (e.g., 126). For instance, the end user may submit a GraphQL query 130 via an application UI 120 of a client device 124. The client device can be of various types, including but not limited to, a mobile phone, a tablet, a desktop computer, and the like. At block 1204, the GraphQL server parses the incoming GraphQL query 130 to determine the operations (e.g., a query operation) to be executed by the query. At block 1206, the GraphQL server validates the query 130 against the GraphQL API schema 122 and the resolver functions 124 to ensure that the query refers to the types and fields defined in the schema. As part of the validation block 1206, the GraphQL server 120 additionally includes capabilities to translate the query operation into a resolver query that can be executed against a particular backend data source that was selected by the API developer during the schema generation process. For instance, if the backend data source selected by the API developer was a relational datasource, the resolver query that is generated by the GraphQL server may be a SELECT clause that executes the operations defined in the SELECT clause to return data (i.e., a query result) from the relational datasource. At block 1208, the GraphQL server executes the operations defined in the query (i.e., the resolver query) against one or more backend data sources (e.g., 108A-108N) to produce a query result. The query result 132 is provided to the end user via the application UI of the device 128.

As previously noted, in certain implementations, the query operation in a query request 130 may identify a filter input variable. The filter input variable may be used to perform filtering operations on one or more object attributes associated with a schema object defined in the schema. The filter input variable enables users to pass in filter arguments that can be used to perform simple filtering operations as well complex filtering operations in a query operation executed on a schema object defined in the GraphQL API schema. Using the filter input variable, users can create expression structures (using the expression attribute) to perform complex filtering operations on a query operation. Examples of the various types of simple filtering operations and complex filtering operations that can be performed in a query operation using the filter input variable are described in detail below.

Example—1

In the example shown below, the filtering operation performed by the filter input variable (filter) in a query operation (listPosts) fetches all posts that have been rated. The filter input variable("filter) specifies a condition attribute (_is_null) that can be applied to an object attribute ("rating") associated with a schema object defined in the schema. The specific condition attribute that can be applied by the filter input variable in a query operation is identified based on the set of condition attributes associated with the filter input object datatype associated with the object attribute. For instance, as depicted in the schema shown in FIG. 9, the "rating" object attribute in the filter object type is associated with an "IntFilterInput" filter input object datatype. Thus, the set of condition attributes associated with the "IntFilterInput" filter input object datatype include the _is_null attribute.

```
listPosts(
    filter: {
        rating: {
            _is_null: FALSE
        }
    }
)
```

Example—2

In the example shown below, the filtering operation performed by the filter input variable (filter) in a query operation (listPosts) fetches all posts that have an identifier that is greater than a certain value (i.e., 5). The filter input variable("filter) specifies a condition attribute (_gt) that can be applied to an object attribute ("id") associated with a schema object defined in the schema. The specific condition attribute that can be applied by the filter input variable in a query operation is identified based on the set of condition attributes associated with the filter input object datatype associated with the object attribute. For instance, as depicted in the schema shown in FIG. 9, the "id" object attribute in the filter object type is associated with an "IDFilterInput" filter input object datatype. Thus, the set of condition attributes associated with the "IDFilterInput" filter input object datatype include the _gt attribute.

```
listPosts(
    filter: {
        id: {
            _gt: "5"
        }
    }
)
```

Example—3

In the example shown below, the filtering operation performed by the filter input variable (filter) in a query operation (listPosts) fetches all posts that have an identifier that is of a certain value (i.e., 1, 3, or 5). The filter input variable("filter) specifies a condition attribute (_in) that can be applied to an object attribute ("id") associated with a schema object defined in the schema. The specific condition attribute that can be applied by the filter input variable in a query operation is identified based on the set of condition attributes associated with the filter input object datatype associated with the object attribute. For instance, as depicted in the schema shown in FIG. 9, the "id" object attribute in the filter object type is associated with an "IDFilterInput" filter input object datatype. Thus, the set of condition attributes associated with the "IDFilterInput" filter input object datatype include the _in attribute.

```
listPosts(
    filter: {
        id: {
            _in: [1,3,5]
        }
    }
)
```

Example—4

In the fourth example shown below, the filtering operation performed by the filter input variable (filter) in a query operation (listPosts) fetches all posts that have an identifier that is other than a set of specified values (i.e., 1, 3, or 5). The filter input variable("filter) specifies a condition attribute (_not_in) that can be applied to an object attribute ("id") associated with the object data type. The specific condition attribute that can be applied by the filter input variable in a query operation is identified based on the set of condition attributes associated with the filter input object datatype associated with the object attribute. For instance, as depicted in the schema shown in FIG. 9, the "id" object attribute in the filter object type is associated with an "IDFilterInput" filter input object datatype. Thus, the set of condition attributes associated with the "IDFilterInput" filter input object datatype include the _in attribute.

```
listPosts(
    filter: {
        id: {
            _not_in: [1,3,5]
        }
    }
)
```

Example 5

In the example shown below, the filtering operation performed by the filter input variable (filter) in a query operation (listPosts) fetches all posts that have the "title" ending with the word "ship." The filter input variable ("filter") specifies a condition attribute (_like) that can be applied to an object attribute ("title") associated with the object data type. The specific condition attribute that can be applied by the filter input variable in a query operation is identified based on the set of condition attributes associated with the filter input object datatype associated with the object attribute. For instance, as depicted in the schema shown in FIG. 9, the "title" object attribute in the filter object type is associated with a "StringFilterInput" filter input object datatype. Thus, the set of condition attributes associated with the "StringFilterInput" filter input object datatype includes the _like attribute.

```
listPosts(
    filter: {
        title: {
            _like: "%ship"
        }
    }
)
```

Example 6

In the example shown below, the filtering operation performed by the filter input variable (filter) in a query operation (listPosts) fetches all posts that have the "title" starting with the word "friend." The filter input variable ("filter") specifies a condition attribute (_like) that can be applied to an object attribute ("title") associated with the object data type. The specific condition attribute that can be applied by the filter input variable in a query operation is identified based on the set of condition attributes associated with the filter input object datatype defined for the object attribute. For instance, as depicted in the schema shown in FIG. 9, the "title" object attribute in the filter object type is associated with a "StringFilterInput" filter input object datatype. Thus, the set of condition attributes associated with the "StringFilterInput" filter input object datatype include the _like attribute.

```
listPosts(
    filter: {
        title: {
            _like: "friend%"
        }
    }
)
```

Example 7

In the example shown below, the filtering operation performed by the filter input variable (filter) in a query operation (listPosts) fetches all posts that have the "title" containing the word "reunion." The filter input variable ("filter") specifies a condition attribute (_like) that can be applied to an object attribute ("title") associated with the object data type. The specific condition attribute that can be applied by the filter input variable in a query operation is identified based on the set of condition attributes associated with the filter input object datatype defined for the object attribute. For instance, as depicted in the schema shown in FIG. 9, the "title" object attribute in the filter object type is associated with a "StringFilterInput" filter input object datatype. Thus, the set of condition attributes associated with the "StringFilterInput" filter input object datatype include the _like attribute.

```
listPosts(
    filter: {
        title: {
            _like: "%reunion%"
        }
    }
)
```

Example 8

In the example shown below, the filtering operation performed by the filter input variable (filter) in a query operation (listPosts) fetches all posts with the "title" having the second alphabet as "t." The filter input variable("filter") specifies a condition attribute (_like) that can be applied to an object attribute ("title") associated with the object data type. The specific condition attribute that can be applied by the filter input variable in a query operation is identified based on the set of condition attributes associated with the filter input object datatype defined for the object attribute. For instance, as depicted in the schema shown in FIG. 9, the "title" object attribute in the filter object type is associated with a "StringFilterInput" filter input object datatype. Thus, the set of condition attributes associated with the "StringFilterInput" filter input object datatype include the _like attribute.

```
{
    filter: {
        title: {
            _like: "_t%"
        }
    }
}
```

Example 9

In the example shown below, the filtering operation performed by the filter input variable (filter) in a query operation (listPosts) fetches all posts with the "title" having only 3 alphabets. The filter input variable("filter") specifies a condition attribute (_like) that can be applied to an object attribute ("title") associated with the object data type. The specific condition attribute that can be applied by the filter input variable in a query operation is identified based on the set of condition attributes associated with the filter input object datatype defined for the object attribute. For instance, as depicted in the schema shown in FIG. 9, the "title" object attribute in the filter object type is associated with a "StringFilterInput" filter input object datatype. Thus, the set of condition attributes associated with the "StringFilterInput" filter input object datatype include the _like attribute.

```
listPosts(
    filter: {
        title: {
            _like: "___"
        }
    }
)
```

Example 10

In the example shown below, the filtering operation performed by the filter input variable (filter) in a query operation (listPosts) fetches all posts that have a description="Technology." The filter input variable("filter") specifies a condition attribute (_eq) that can be applied to an object attribute ("desc") associated with the object data type. The specific condition attribute that can be applied by the filter input variable in a query operation is identified based on the set of condition attributes associated with the filter input object datatype defined for the object attribute. For instance, as depicted in the schema shown in FIG. 9, the "desc" object attribute in the filter object type is associated with a "StringFilterInput" filter input object datatype. Thus, the set of condition attributes associated with the "StringFilterInput" filter input object datatype include the _eq attribute.

```
listPosts(
    filter: {
```

-continued

```
            desc: {
                _eq: "Technology"
            }
        }
    )
```

As previously noted, in certain examples, the filter input variable may be used to perform complex filtering operations in a query operation. The complex filtering operations may be performed by the filter input variable using a combination of one or more custom attributes (e.g., the expression attribute, the logical operator attribute and/or the negation operator attribute). The custom attributes may be used as input arguments in the filter input variable of a query operation to perform complex filtering operations to fetch data associated with one or more object attributes of the object type. For instance, an expression attribute may be used as an input argument in the filter input variable of a query operation to identify a set of expressions to be evaluated by the query operation. An expression to be evaluated by a query operation using an expression attribute may identify a set of object attributes associated with the filter input object. The expression may additionally identify a set of conditional attributes applied to the set of object attributes and a set of values associated with each attribute. Additional examples of the various types of complex filtering operations that can be performed in a query operation using expression attributes, logical operator attributes and negation attributes are described in detail below.

Example 11

In the example shown below, the filter input variable (filter) performs a complex filtering operation in a query operation (listPosts) to fetch all posts except (a) posts with an identifier equal to 1 and the title starting with "The" and (b) posts with an identifier equal to 4 and title containing "The." In this example, the complex filtering operation comprises a set of expressions to be evaluated by the query operation (listPosts). The first expression specifies that all posts with "id"=1 and "title" starting with "The" are to be fetched for the post object. The first expression is created using the expression attribute (_expr) and identifies an object attribute (id) associated with the PostFilterInput object. The first expression additionally identifies a conditional attribute (_eq) applied to the object attribute and a value (1) associated with the conditional attribute. The second expression specifies that all posts with "id"=4 and "title" starting with "The" are to be fetched.

The second expression is also created using the expression attribute and identifies an object attribute (id) associated with the PostFilterInput object. The second expression additionally identifies a conditional attribute (_eq) applied to the object attribute and a value (4) associated with the conditional attribute. The two expressions are further combined using a logical operator (AND) and the resultant expression is combined with a negation operator (NOT) to fetch all posts except (i.e., that exclude) (a) posts with an identifier equal to 1 and the title starting with "The" and (b) posts with an identifier equal to 4 and title containing "The" to form the complex filtering operation.

```
listPosts(
    filter: {
```

```
        _not: {
            _expr: [
                {
                    id: {
                        _eq: "1"
                    },
                    title: {
                        _like: "The%"
                    },
                    _operator: AND //optional if AND as it is default
                },
                {
                    id: {
                        _eq: "4"
                    },
                    title: {
                        _like: "%The%"
                    },
                    _operator: AND //optional if AND as it is default
                }
            ],
            _operator: AND //optional if AND as it is default
        }
    }
)
```

Example 12

In the example shown below, the filter input variable (filter) performs a complex filtering operation in a query operation (listPosts) to fetch all posts with (a) a rating greater than "3" AND hits less than "5" OR (b) id greater than "5" AND title begins with "The" OR (c) desc contains "bio" AND hits between 1 and 100. In this example, the complex filtering operation identifies three expressions to be evaluated by the query operation (listPosts). The first expression specifies that all posts with a rating greater than "3" AND hits less than "5" are to be fetched for the post object. The first expression is created using the expression attribute (_expr) and identifies a set of one or more object attributes (rating, hits) associated with the PostFilterInput object. The first expression additionally identifies one or more conditional attributes (_gt, _lt) applied to the object attributes and corresponding values (3, 5) associated with the conditional attributes. The second expression specifies that all posts with id greater than "5" AND title that begins with "The" are to be fetched. The second expression is also created using the expression attribute and identifies a set of object attributes (id, title) associated with the PostFilterInput object. The second expression additionally identifies a set of conditional attributes (_gt, _like) applied to the object attributes and corresponding values (5, The) associated with the conditional attributes. The third expression specifies that all posts with desc contains "bio" AND hits between "1-100" are to be fetched. The third expression is also created using the expression attribute and identifies a set of object attributes (desc, hits) associated with the PostFilterInput object. The third expression additionally identifies a set of conditional attributes (_like, _between, _floor, _ceiling) applied to the object attributes and corresponding values (bio and 1, 100) associated with the conditional attributes. The first, second and third expressions are further combined using a logical operator (e.g., AND or OR) to form the complex filtering operation as shown below:

```
listPosts(
    filter: {
```

```
            _expr: [
                {
                    _expr: [
                        {
                            rating: {
                                _gt: 3
                            },
                            hits: {
                                _lt: 5
                            },
                            _operator: AND //optional if AND as it is
default
                        }
                    ]
                },
                {
                    _expr: [
                        {
                            id: {
                                _gt: "5"
                            },
                            title: {
                                _like: "The%"
                            }
                        },
                        {
                            desc: {
                                _like: "%bio%"
                            },
                            hits: {
                                _between: {
                                    _floor: 1,
                                    _ceiling: 100
                                }
                            }
                        }
                    ],
                    _operator: OR
                }
            ],
            _operator: OR
        }
    )
```

As noted above, during query execution, the GraphQL server translates the query operation (listPosts) into a resolver query that can be executed against a particular backend data source that was selected by the API developer during the schema generation process. For instance, if the backend data source selected by the API developer was a relational datasource, the resolver query that is generated by the GraphQL server may be a SELECT clause as shown below:

```
SELECT *
FROM Posts
    WHERE (rating > 3 and hits <'5') or (id > '3' and title ='The') or
    (decs LIKE '%bio%' and hits BETWEEN 1 AND 100)
```

The GraphQL server executes the operations defined in the SELECT clause to return data (i.e., a query result) from the relational datasource.

Example 13

In the example shown below, the filter input variable (filter) performs a complex filtering operation in a query operation (listPosts) to fetch all posts with "id" greater than 20 AND an "id" less than 100 AND "title" begins with "The." In this example, the complex filtering operation assumes an "AND" operation by default as shown below:

```
    listPosts(
        filter: {
            id: {
                _gt: "20",
                _lt: "100"
            },
            title: {
                _like: "The%"
            }
        }
    )
```

Example 14

In the example shown below, the filter input variable (filter) performs a complex filtering operation in a query operation (listPosts) to fetch all posts with "id" less than 20 OR "title" which begins with "The." In this case, the filter input variable explicitly specifies a logical operator "OR" in the query operation as shown below:

```
    filter: {
        id: {
            _lt: "20"
        },
        title: {
            _like: "The%"
        },
        _operator: OR
    }
    )
```

Example 15

In the example shown below, the filter input variable (filter) performs a complex filtering operation in a query operation (listPosts) to fetch all posts with "id" greater than "5" OR "title" that begins with "The" OR "desc" contains "bio" AND "hits" is between 1 and 100. In this case, the filter input variable specifies an expression operator (_expr) as well as a logical operator "OR" to perform a complex filtering operation in the query operation as shown below:

```
    listPosts(
        filter: {
            id: {
                _gt: "5"
            },
            title: {
                _like: "The%"
            },
            _operator: OR ,
            _expr: [ {
                desc: {
                    _like: "%bio%"
                },
                hits: {
                    _between: {
                        _floor: 1,
                        _ceiling: 100
                    }
                }
            } ]
        }
    )
```

Example 16

In the example shown below, the filter input variable (filter) performs a complex filtering operation in a query operation (listPosts) to fetch all posts with "id" greater than "5" AND "title" that begins with "The" OR "desc" contains "bio" AND "hits" is between 1 and 100. In this case, the filter input variable specifies an expression operator (_expr) as well as the logical operator "OR" and the logical operator "AND" to perform a complex filtering operation in the query operation as shown below:

```
listPosts(
    filter: {
        _expr: [
            {
                id: {
                    _gt: "5"
                },
                title: {
                    _like: "The%"
                }
            },
            {
                desc: {
                    _like: "%bio%"
                },
                hits: {
                    _between: {
                        _floor: 1
                        _ceiling: 100
                    }
                }
            }
        ],
        _operator: OR
    }
)
```

Example 17

In the example shown below, the filter input variable (filter) performs a complex filtering operation in a query operation (listPosts) to fetch all posts with "id" greater than "5" OR posts without "desc" contains "bio" AND "hits" between 1 and 100. In this case, the filter input variable specifies an expression operator (_expr) as well as the logical operator "OR" and the negation operator "NOT" to perform a complex filtering operation in the query operation as shown below:

```
listPosts(
    filter: {
        id: {
            _gt: "5"
        },
        _operator: OR ,
        _not: {
            desc: {
                _like: "%bio%"
            },
            hits: {
                _between: {
                    _floor: 1
                    _ceiling: 100
                }
            }
        }
    }
)
```

Example 18

In certain examples, the expression attribute can support nested operations by nesting a second expression inside a first expression to perform the complex filtering operation as shown in the example below.

```
filter: {
    _expr: [
        {
            id: {
                _gt: "5"
            }
        },
        {
            title: {
                _like: "The%"
            }
        }
    ],
    _operator: OR,
    _not: {
        desc: {
            _like: "%bio%"
        },
        hits: {
            _between: {
                _floor: 1
                _ceiling: 100
            }
        }
    }
}
)
```

As previously noted, the filter input object generated by the filter input object design subsystem 107 can be applied to different types of backend datasources such as relational databases, REST APIs and so on. During query execution, the GraphQL server includes capabilities to translate the query operation (e.g., listPosts) as described in examples 1-18 above into a corresponding resolver query that can be executed against a particular backend data source that was selected by the API developer during the schema generation process. For instance, if the backend data source selected by the API developer was a relational datasource, the resolver query that is generated by the GraphQL server may be a SELECT clause.

FIG. 13-FIG. 16 depict additional examples of query operations that can be executed by a GraphQL server (e.g., 120) shown in FIG. 1 and the query results that are produced as a result of execution of the query operations against a backend data source. In certain embodiments, and as depicted in FIG. 1, the queries may be submitted by a user (e.g., 126) via the application UI 128 of the user's device 124 and the result of the execution of the queries may be also provided to the end user via the UI 128.

Figure 13:
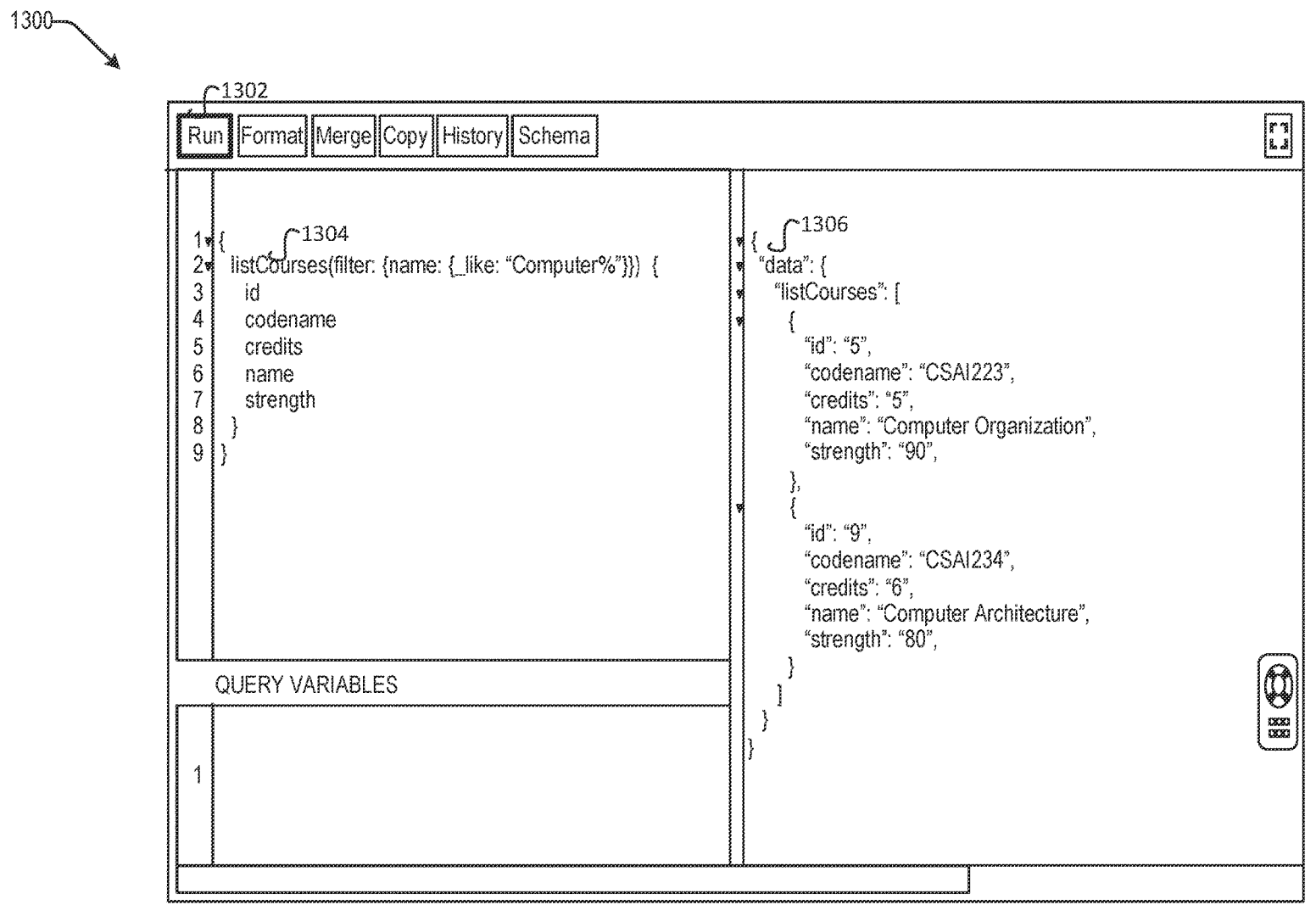

FIG. 13 is an example of a graphical user interface (GUI) 1300 for submitting a GraphQL query and displaying a query result, according to certain embodiments. In certain examples, the GUI 1300 may be a UI component of the application UI 128 of the end user's device 124. As shown in FIG. 13, in certain examples, an end user may submit a query request (i.e., a GraphQL query) via the UI 1300. For instance, in the example shown in FIG. 13, the query request identifies a query operation (listCourses) 1304. The query operation additionally identifies the filter input variable ("filter) that is used to perform filtering operations on one or more object attributes of the filter input object. Upon selecting the "run" button 1302 in the UI 1300, the query is executed. As a result of the execution of the query, a query result 1306 is displayed on a different window of the UI 1300.

FIG. 14 is another example of a graphical user interface (GUI) 1400 for submitting a GraphQL query and displaying a query result, according to certain embodiments. In certain examples, the GUI 1400 may be a UI component of the application UI 128 of the end user's device 124. As shown in FIG. 14, in certain examples, an end user may submit a query request (i.e., a GraphQL query) via the UI 1400. For instance, in the example shown in FIG. 14, the query request identifies a query operation (listCourses) 1402. The query operation additionally identifies the filter input variable ("filter") that is used to perform filtering operations on one or more object attributes of the filter input object. In this example, the filter input variable uses a combination of one or more custom attributes (such as the _expr attribute and the logical operator attribute, OR) to perform a complex filtering operation on one or more object attributes of the filter input object. Upon selecting the "run" button 1302 in the UI 1400, the query is executed. As a result of the execution of the query, a query result 1404 is displayed in a different window of the UI 1400.

FIG. 15 is yet another example of a graphical user interface (GUI) 1500 for submitting a GraphQL query and displaying a query result, according to certain embodiments. In certain examples, the GUI 1500 may be a UI component of the application UI 128 of the end user's device 124. As shown in FIG. 15, in certain examples, an end user may submit a query request (i.e., a GraphQL query) via the UI 1500. For instance, in the example shown in FIG. 15, the query request identifies a query operation (listCourses) 1502. The query operation additionally identifies the filter input variable ("filter) that is used to perform filtering operations on one or more object attributes of the filter input object. In this example, the filter input variable uses a combination of one or more custom attributes (such as the _expr attribute and the logical operator attributes, OR and AND) to perform a complex filtering operation on one or more object attributes of the filter input object. Upon selecting the "run" button 1302 in the UI 1500, the query is executed. As a result of the execution of the query, a query result 1504 is displayed in a different window of the UI 1500.

GraphQL API Schema Modifications

In certain embodiments, the GraphQL API schema may be edited/modified by a user (e.g., an API developer 118) of the GraphQL API schema design system 102 prior to the publishing of the schema. For instance, the API developer 118 may modify a GraphQL schema generated by the schema generation subsystem 106 and the filter object design subsystem 107 by adding and/or removing object fields for object types defined in the schema, adding or removing filter input objects associated with the object types, adding or removing object attributes of a filter input object, adding or removing condition attributes associated with filter input object datatypes defined as part of the schema and so on. Additionally, an API developer 118 can also edit the resolver functions associated with object fields defined in the GraphQL schema. In certain implementations, a user may directly edit the GraphQL API schema via the UI by adding or removing object types and/or object fields defined in the schema. In other implementations, the GraphQL API schema may be edited via the UI by editing one or more previously selected tables, columns and/or operations defined in the schema. For instance, the user, may via the UI add a column name to the schema, or remove a table that was previously selected via the GUI. The API developer may then select the "Generate Schema" button to execute the modified selections to generate the modified/edited GraphQL schema.

Existing approaches used by GraphQL API development techniques do not provide capabilities by which schema objects (e.g., object types, filter input objects and so on) defined in a GraphQL API schema can be modified by a user (e.g., an API developer) during schema generation. This results in the generation of a fixed GraphQL API schema that comprises a standard set of object types and filter input objects for the object types. The disclosed GraphQL API schema design system 102 overcomes the drawbacks of existing GraphQL development techniques by including capabilities by which a GraphQL API schema can be modified/edited during schema generation. For instance, using the disclosed system, an API developer can identify the specific object types in the schema that need filtering and identify the specific attributes (e.g., object attributes and custom attributes) to be supported by the filter input object along with the logical and relational operations that the API developer wants to expose to end users of the system. For example, for a filter input object generated by the filter object design subsystem 107, the API developer can choose not to expose certain fields of the Post object (e.g., 904) in the filter input object by removing certain attributes of the filter input object as shown below. In the example shown below, the API developer can choose not to include expression attributes and to include only certain object attributes (e.g., id and title) to be filtered upon in a query operation by certain attributes of the filter input object as shown below:

```
input PostFilterInput {
    id: IDFilterInput
    title : StringFilterInput
    _operator: LogicalOperator
    _not : PostFilterInput
}
```

As another example, an API developer can choose to remove one or more condition attributes in a filter input object datatype associated with an object attribute. For instance, the API developer can remove certain comparators in the StringInputFilter object (e.g., 1104 shown in FIG. 11) and the IDInputFilter object 1108 as shown below:

```
input StringFilterInput {
    _ne: String
    _eq: String
}
input IDInputFilter{
    _ne: ID
    _eq: ID
    _in : [String]
    _not_in : [String]
}
```

The flexibility provided by the disclosed system to enable schema objects in a GraphQL API schema to be edited allows an API developer to control the types of query operations and filters that can be supported by a GraphQL API during query execution. For instance, certain filtering operations may be expensive in terms of database resources for existing database schemas which may not have indexes already created on them. In such cases, the API developer can choose to not support those objects with complex filtering operations during the GraphQL API schema generation process. The disclosed system provides this flexibility to the developer for various types of schema objects such as filter input objects, filter input object datatypes, query objects and so on that are defined in the schema.

The inability of existing GraphQL development techniques to alter schema objects (e.g., filter input objects) in the schema implies that an API developer always has to expose filtering on nested objects and all its attributes and not just the parent object that is being queried. As shown in the example below, an object type (e.g., Post) defined in the schema may include a 'comments' field that returns a list of Comment objects as shown below. Using the capabilities provided by the disclosed system, an API developer can, depending on the application's requirement, choose to expose only a limited set of filter functionality by removing the comments filer input object inside the Post filter object.

```
type Post {
    id : ID!
    title : String!
    desc : String
    hits : Int
    rating : Int
    comments: [Comment]
}
type Comment{
    id : ID!
    comment : String
    username: String
}
input PostFilterInput {
    id: IDFilterInput
    title : StringFilterInput
    comments: CommentFilterInput
    _operator: LogicalOperator
    _not : PostFilterInput
}
input CommentFilterInput{
    id : IDFilterInput
    comment : StringFilterInput
    username: StringFilterInput
    _operator: LogicalOperator
}
```

The filter input object designed by the filter object design subsystem provides the ability for a GraphQL API user (i.e., an API developer or an end user) to perform simple filtering operations as well complex filtering operations on a query operation executed on a schema object defined in the GraphQL API schema. Using the filter input object, a GraphQL user can construct filtering arguments that can be applied to various different backend datasources such as REST APIs, relational databases and so on. In addition, the filter input object provides the ability for a GraphQL API user to create expression structures as filter arguments in a query operation executed on a schema object. Using the expression structures, a user can perform complex filtering operations in the query operation against various different backend datasources.

The disclosed system additionally enables schema objects and filter input objects in a GraphQL API schema to be modified. By providing capabilities to modify a filter input object, an API developer can control the types of query operations and filters that can be supported by a GraphQL API during query execution. For instance, certain filtering operations may be expensive in terms of database resources for existing database schemas which may not have indexes already created on them. In such cases, the API developer can choose to not support those objects with complex filtering operations during the GraphQL API schema generation process. The disclosed system provides this flexibility to the developer for various types of schema objects such as filter input objects, filter input object datatypes, query objects and so on that are defined in the schema.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially ondemand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 16:
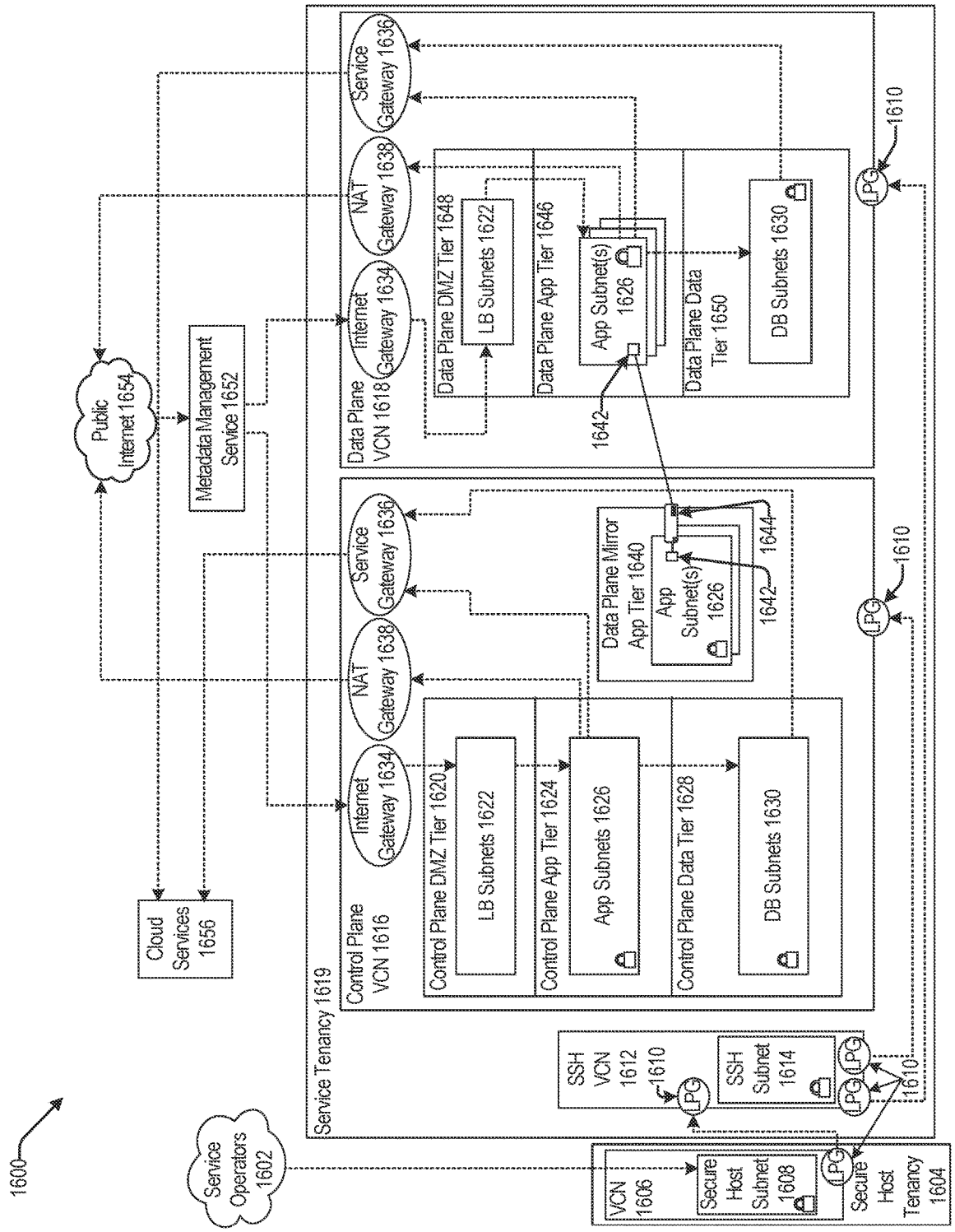
FIG. 16 is a block diagram illustrating one pattern for implementing a cloud infrastructure as a service system, according to at least one embodiment.

FIG. 16 is a block diagram 1600 illustrating an example pattern of an IaaS architecture, according to at least one embodiment. Service operators 1602 can be communicatively coupled to a secure host tenancy 1604 that can include a virtual cloud network (VCN) 1606 and a secure host subnet 1608. In some examples, the service operators 1602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1606 and/or the Internet.

The VCN 1606 can include a local peering gateway (LPG) 1610 that can be communicatively coupled to a secure shell (SSH) VCN 1612 via an LPG 1610 contained in the SSH VCN 1612. The SSH VCN 1612 can include an SSH subnet 1614, and the SSH VCN 1612 can be communicatively coupled to a control plane VCN 1616 via the LPG 1610 contained in the control plane VCN 1616. Also, the SSH VCN 1612 can be communicatively coupled to a data plane VCN 1618 via an LPG 1610. The control plane VCN 1616 and the data plane VCN 1618 can be contained in a service tenancy 1619 that can be owned and/or operated by the IaaS provider.

The control plane VCN 1616 can include a control plane demilitarized zone (DMZ) tier 1620 that acts as a perimeter network (e.g., portions of a corporate network between the corporate intranet and external networks). The DMZ-based servers may have restricted responsibilities and help keep breaches contained. Additionally, the DMZ tier 1620 can include one or more load balancer (LB) subnet(s) 1622, a control plane app tier 1624 that can include app subnet(s) 1626, a control plane data tier 1628 that can include database (DB) subnet(s) 1630 (e.g., frontend DB subnet(s) and/or backend DB subnet(s)). The LB subnet(s) 1622 contained in the control plane DMZ tier 1620 can be communicatively coupled to the app subnet(s) 1626 contained in the control plane app tier 1624 and an Internet gateway 1634 that can be contained in the control plane VCN 1616, and the app subnet(s) 1626 can be communicatively coupled to the DB subnet(s) 1630 contained in the control plane data tier 1628 and a service gateway 1636 and a network address translation (NAT) gateway 1638. The control plane VCN 1616 can include the service gateway 1636 and the NAT gateway 1638.

The control plane VCN 1616 can include a data plane mirror app tier 1640 that can include app subnet(s) 1626. The app subnet(s) 1626 contained in the data plane mirror app tier 1640 can include a virtual network interface controller (VNIC) 1642 that can execute a compute instance 1644. The compute instance 1644 can communicatively couple the app subnet(s) 1626 of the data plane mirror app tier 1640 to app subnet(s) 1626 that can be contained in a data plane app tier 1646.

The data plane VCN 1618 can include the data plane app tier 1646, a data plane DMZ tier 1648, and a data plane data tier 1650. The data plane DMZ tier 1648 can include LB subnet(s) 1622 that can be communicatively coupled to the app subnet(s) 1626 of the data plane app tier 1646 and the Internet gateway 1634 of the data plane VCN 1618. The app subnet(s) 1626 can be communicatively coupled to the service gateway 1636 of the data plane VCN 1618 and the NAT gateway 1638 of the data plane VCN 1618. The data plane data tier 1650 can also include the DB subnet(s) 1630 that can be communicatively coupled to the app subnet(s) 1626 of the data plane app tier 1646.

The Internet gateway 1634 of the control plane VCN 1616 and of the data plane VCN 1618 can be communicatively coupled to a metadata management service 1652 that can be communicatively coupled to public Internet 1654. Public Internet 1654 can be communicatively coupled to the NAT gateway 1638 of the control plane VCN 1616 and of the data plane VCN 1618. The service gateway 1636 of the control plane VCN 1616 and of the data plane VCN 1618 can be communicatively couple to cloud services 1656.

In some examples, the service gateway 1636 of the control plane VCN 1616 or of the data plane VCN 1618 can make application programming interface (API) calls to cloud services 1656 without going through public Internet 1654. The API calls to cloud services 1656 from the service gateway 1636 can be one-way: the service gateway 1636 can make API calls to cloud services 1656, and cloud services 1656 can send requested data to the service gateway 1636. But, cloud services 1656 may not initiate API calls to the service gateway 1636.

In some examples, the secure host tenancy 1604 can be directly connected to the service tenancy 1619, which may be otherwise isolated. The secure host subnet 1608 can communicate with the SSH subnet 1614 through an LPG 1610 that may enable two-way communication over an otherwise isolated system. Connecting the secure host subnet 1608 to the SSH subnet 1614 may give the secure host subnet 1608 access to other entities within the service tenancy 1619.

The control plane VCN 1616 may allow users of the service tenancy 1619 to set up or otherwise provision desired resources. Desired resources provisioned in the control plane VCN 1616 may be deployed or otherwise used in the data plane VCN 1618. In some examples, the control plane VCN 1616 can be isolated from the data plane VCN 1618, and the data plane mirror app tier 1640 of the control plane VCN 1616 can communicate with the data plane app tier 1646 of the data plane VCN 1618 via VNICs 1642 that can be contained in the data plane mirror app tier 1640 and the data plane app tier 1646.

In some examples, users of the system, or customers, can make requests, for example create, read, update, or delete (CRUD) operations, through public Internet 1654 that can communicate the requests to the metadata management service 1652. The metadata management service 1652 can communicate the request to the control plane VCN 1616 through the Internet gateway 1634. The request can be received by the LB subnet(s) 1622 contained in the control plane DMZ tier 1620. The LB subnet(s) 1622 may determine that the request is valid, and in response to this determination, the LB subnet(s) 1622 can transmit the request to app subnet(s) 1626 contained in the control plane app tier 1624. If the request is validated and requires a call to public Internet 1654, the call to public Internet 1654 may be transmitted to the NAT gateway 1638 that can make the call to public Internet 1654. Metadata that may be desired to be stored by the request can be stored in the DB subnet(s) 1630.

In some examples, the data plane mirror app tier 1640 can facilitate direct communication between the control plane VCN 1616 and the data plane VCN 1618. For example, changes, updates, or other suitable modifications to configuration may be desired to be applied to the resources contained in the data plane VCN 1618. Via a VNIC 1642, the control plane VCN 1616 can directly communicate with, and can thereby execute the changes, updates, or other suitable modifications to configuration to, resources contained in the data plane VCN 1618.

In some embodiments, the control plane VCN 1616 and the data plane VCN 1618 can be contained in the service tenancy 1619. In this case, the user, or the customer, of the system may not own or operate either the control plane VCN 1616 or the data plane VCN 1618. Instead, the IaaS provider may own or operate the control plane VCN 1616 and the data plane VCN 1618, both of which may be contained in the service tenancy 1619. This embodiment can enable isolation of networks that may prevent users or customers from interacting with other users', or other customers', resources. Also, this embodiment may allow users or customers of the system to store databases privately without needing to rely on public Internet 1654, which may not have a desired level of threat prevention, for storage.

In other embodiments, the LB subnet(s) 1622 contained in the control plane VCN 1616 can be configured to receive a signal from the service gateway 1636. In this embodiment, the control plane VCN 1616 and the data plane VCN 1618 may be configured to be called by a customer of the IaaS provider without calling public Internet 1654. Customers of the IaaS provider may desire this embodiment since database(s) that the customers use may be controlled by the IaaS provider and may be stored on the service tenancy 1619, which may be isolated from public Internet 1654.

Figure 17:
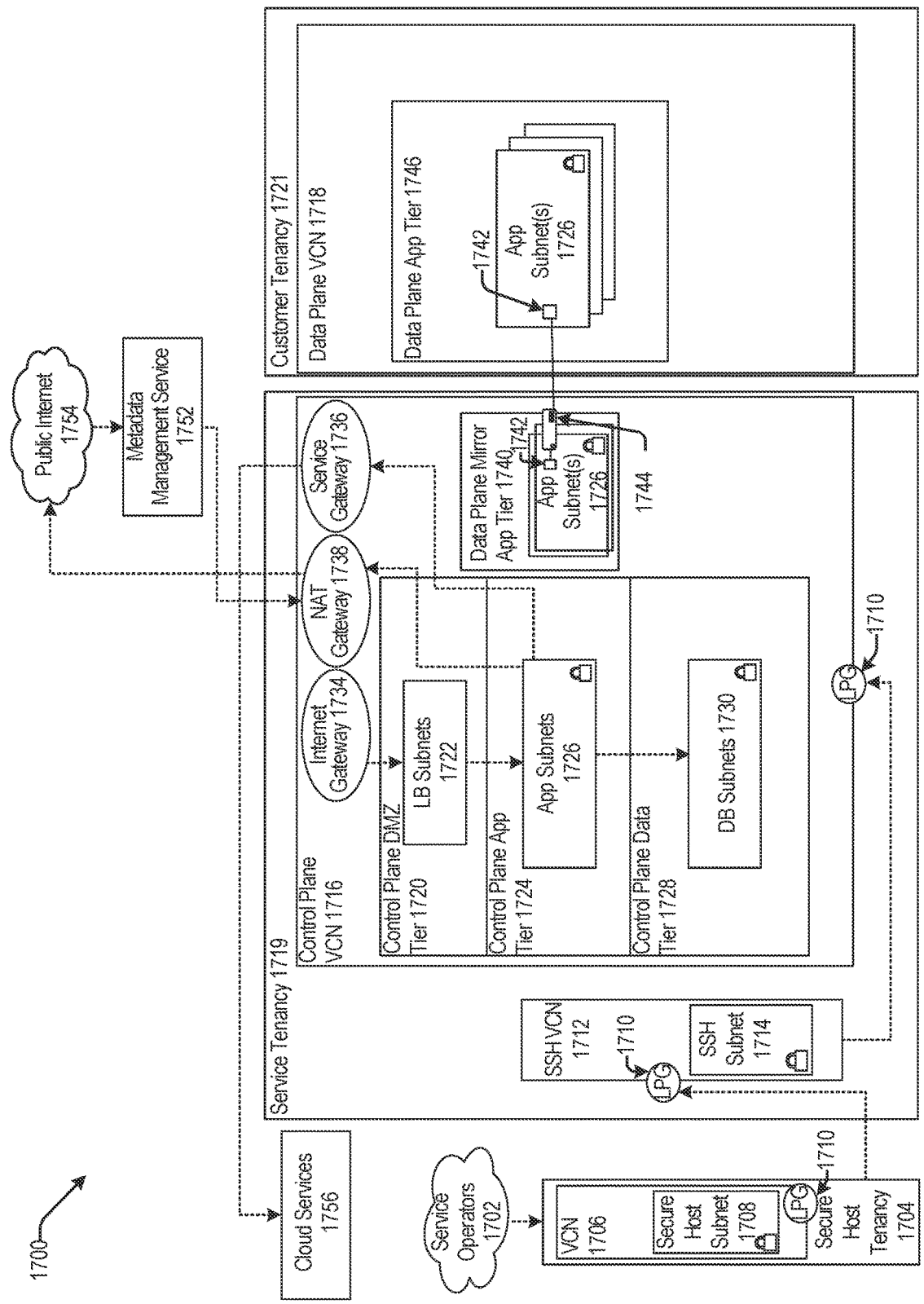
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g., service operators 1602 of FIG. 16) can be communicatively coupled to a secure host tenancy 1704 (e.g., the secure host tenancy 1604 of FIG. 16) that can include a virtual cloud network (VCN) 1706 (e.g., the VCN 1606 of FIG. 16) and a secure host subnet 1708 (e.g., the secure host subnet 1608 of FIG. 16). The VCN 1706 can include a local peering gateway (LPG) 1710 (e.g., the LPG 1610 of FIG. 16) that can be communicatively coupled to a secure shell (SSH) VCN 1712 (e.g., the SSH VCN 1612 of FIG. 16) via an LPG 1610 contained in the SSH VCN 1712. The SSH VCN 1712 can include an SSH subnet 1714 (e.g., the SSH subnet 1614 of FIG. 16), and the SSH VCN 1712 can be communicatively coupled to a control plane VCN 1716 (e.g., the control plane VCN 1616 of FIG. 16) via an LPG 1710 contained in the control plane VCN 1716. The control plane VCN 1716 can be contained in a service tenancy 1719 (e.g., the service tenancy 1619 of FIG. 16), and the data plane VCN 1718 (e.g., the data plane VCN 1618 of FIG. 16) can be contained in a customer tenancy 1721 that may be owned or operated by users, or customers, of the system.

The control plane VCN 1716 can include a control plane DMZ tier 1720 (e.g., the control plane DMZ tier 1620 of FIG. 16) that can include LB subnet(s) 1722 (e.g., LB subnet(s) 1622 of FIG. 16), a control plane app tier 1724 (e.g., the control plane app tier 1624 of FIG. 16) that can include app subnet(s) 1726 (e.g., app subnet(s) 1626 of FIG. 16), a control plane data tier 1728 (e.g., the control plane data tier 1628 of FIG. 16) that can include database (DB) subnet(s) 1730 (e.g., similar to DB subnet(s) 1630 of FIG. 16). The LB subnet(s) 1722 contained in the control plane DMZ tier 1720 can be communicatively coupled to the app subnet(s) 1726 contained in the control plane app tier 1724 and an Internet gateway 1734 (e.g., the Internet gateway 1634 of FIG. 16) that can be contained in the control plane VCN 1716, and the app subnet(s) 1726 can be communicatively coupled to the DB subnet(s) 1730 contained in the control plane data tier 1728 and a service gateway 1736 (e.g., the service gateway 1636 of FIG. 16) and a network address translation (NAT) gateway 1738 (e.g., the NAT gateway 1638 of FIG. 16). The control plane VCN 1716 can include the service gateway 1736 and the NAT gateway 1738.

The control plane VCN 1716 can include a data plane mirror app tier 1740 (e.g., the data plane mirror app tier 1640 of FIG. 16) that can include app subnet(s) 1726. The app subnet(s) 1726 contained in the data plane mirror app tier 1740 can include a virtual network interface controller (VNIC) 1742 (e.g., the VNIC of 1642) that can execute a compute instance 1744 (e.g., similar to the compute instance 1644 of FIG. 16). The compute instance 1744 can facilitate communication between the app subnet(s) 1726 of the data plane mirror app tier 1740 and the app subnet(s) 1726 that can be contained in a data plane app tier 1746 (e.g., the data plane app tier 1646 of FIG. 16) via the VNIC 1742 contained in the data plane mirror app tier 1740 and the VNIC 1742 contained in the data plane app tier 1746.

The Internet gateway 1734 contained in the control plane VCN 1716 can be communicatively coupled to a metadata management service 1752 (e.g., the metadata management service 1652 of FIG. 16) that can be communicatively coupled to public Internet 1754 (e.g., public Internet 1654 of FIG. 16). Public Internet 1754 can be communicatively coupled to the NAT gateway 1738 contained in the control plane VCN 1716. The service gateway 1736 contained in the control plane VCN 1716 can be communicatively couple to cloud services 1756 (e.g., cloud services 1656 of FIG. 16).

In some examples, the data plane VCN 1718 can be contained in the customer tenancy 1721. In this case, the IaaS provider may provide the control plane VCN 1716 for each customer, and the IaaS provider may, for each customer, set up a unique compute instance 1744 that is contained in the service tenancy 1719. Each compute instance 1744 may allow communication between the control plane VCN 1716, contained in the service tenancy 1719, and the data plane VCN 1718 that is contained in the customer tenancy 1721. The compute instance 1744 may allow resources, that are provisioned in the control plane VCN 1716 that is contained in the service tenancy 1719, to be deployed or otherwise used in the data plane VCN 1718 that is contained in the customer tenancy 1721.

In other examples, the customer of the IaaS provider may have databases that live in the customer tenancy 1721. In this example, the control plane VCN 1716 can include the data plane mirror app tier 1740 that can include app subnet(s) 1726. The data plane mirror app tier 1740 can reside in the data plane VCN 1718, but the data plane mirror app tier 1740 may not live in the data plane VCN 1718. That is, the data plane mirror app tier 1740 may have access to the customer tenancy 1721, but the data plane mirror app tier 1740 may not exist in the data plane VCN 1718 or be owned or operated by the customer of the IaaS provider. The data plane mirror app tier 1740 may be configured to make calls to the data plane VCN 1718 but may not be configured to make calls to any entity contained in the control plane VCN 1716. The customer may desire to deploy or otherwise use resources in the data plane VCN 1718 that are provisioned in the control plane VCN 1716, and the data plane mirror app tier 1740 can facilitate the desired deployment, or other usage of resources, of the customer.

In some embodiments, the customer of the IaaS provider can apply filters to the data plane VCN 1718. In this embodiment, the customer can determine what the data plane VCN 1718 can access, and the customer may restrict access to public Internet 1754 from the data plane VCN 1718. The IaaS provider may not be able to apply filters or otherwise control access of the data plane VCN 1718 to any outside networks or databases. Applying filters and controls by the customer onto the data plane VCN 1718, contained in the customer tenancy 1721, can help isolate the data plane VCN 1718 from other customers and from public Internet 1754.

In some embodiments, cloud services 1756 can be called by the service gateway 1736 to access services that may not exist on public Internet 1754, on the control plane VCN 1716, or on the data plane VCN 1718. The connection between cloud services 1756 and the control plane VCN 1716 or the data plane VCN 1718 may not be live or continuous. Cloud services 1756 may exist on a different network owned or operated by the IaaS provider. Cloud services 1756 may be configured to receive calls from the service gateway 1736 and may be configured to not receive calls from public Internet 1754. Some cloud services 1756 may be isolated from other cloud services 1756, and the control plane VCN 1716 may be isolated from cloud services 1756 that may not be in the same region as the control plane VCN 1716. For example, the control plane VCN 1716 may be located in "Region 1," and cloud service "Deployment 16," may be located in Region 1 and in "Region 2." If a call to Deployment 16 is made by the service gateway 1736 contained in the control plane VCN 1716 located in Region 1, the call may be transmitted to Deployment 16 in Region 1. In this example, the control plane VCN 1716, or Deployment 16 in Region 1, may not be communicatively coupled to, or otherwise in communication with, Deployment 16 in Region 2.

Figure 18:
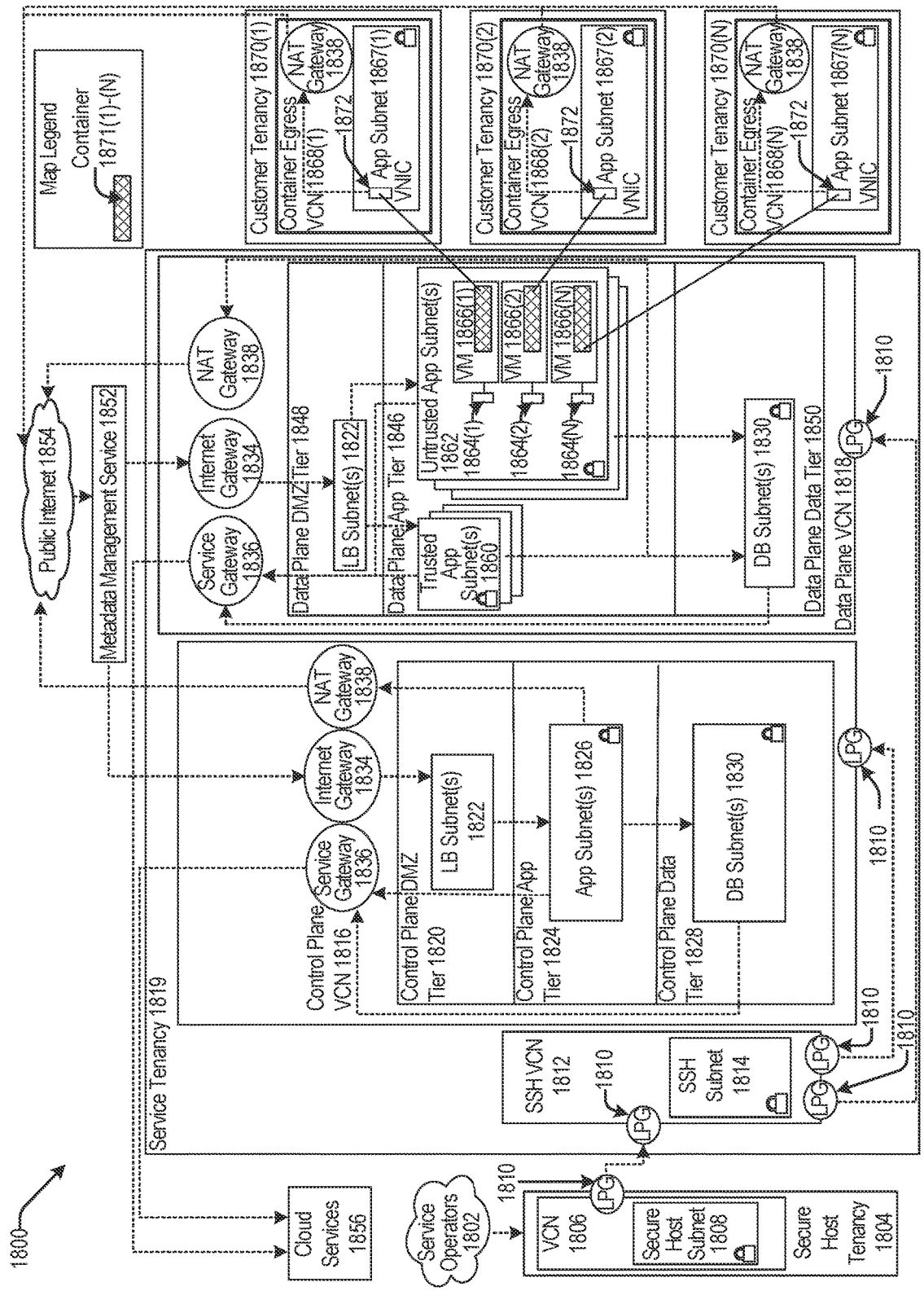
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g., service operators 1602 of FIG. 16) can be communicatively coupled to a secure host tenancy 1804 (e.g., the secure host tenancy 1604 of FIG. 16) that can include a virtual cloud network (VCN) 1806 (e.g., the VCN 1606 of FIG. 16) and a secure host subnet 1808 (e.g., the secure host subnet 1608 of FIG. 16). The VCN 1806 can include an LPG 1810 (e.g., the LPG 1610 of FIG. 16) that can be communicatively coupled to an SSH VCN 1812 (e.g., the SSH VCN 1612 of FIG. 16) via an LPG 1810 contained in the SSH VCN 1812. The SSH VCN 1812 can include an SSH subnet 1814 (e.g., the SSH subnet 1614 of FIG. 16), and the SSH VCN 1812 can be communicatively coupled to a control plane VCN 1816 (e.g., the control plane VCN 1616 of FIG. 16) via an LPG 1810 contained in the control plane VCN 1816 and to a data plane VCN 1818 (e.g., the data plane 1618 of FIG. 16) via an LPG 1810 contained in the data plane VCN 1818. The control plane VCN 1816 and the data plane VCN 1818 can be contained in a service tenancy 1819 (e.g., the service tenancy 1619 of FIG. 16).

The control plane VCN 1816 can include a control plane DMZ tier 1820 (e.g., the control plane DMZ tier 1620 of FIG. 16) that can include load balancer (LB) subnet(s) 1822 (e.g., LB subnet(s) 1622 of FIG. 16), a control plane app tier 1824 (e.g., the control plane app tier 1624 of FIG. 16) that can include app subnet(s) 1826 (e.g., similar to app subnet(s) 1626 of FIG. 16), a control plane data tier 1828 (e.g., the control plane data tier 1628 of FIG. 16) that can include DB subnet(s) 1830. The LB subnet(s) 1822 contained in the control plane DMZ tier 1820 can be communicatively coupled to the app subnet(s) 1826 contained in the control plane app tier 1824 and to an Internet gateway 1834 (e.g., the Internet gateway 1634 of FIG. 16) that can be contained in the control plane VCN 1816, and the app subnet(s) 1826 can be communicatively coupled to the DB subnet(s) 1830 contained in the control plane data tier 1828 and to a service gateway 1836 (e.g., the service gateway of FIG. 16) and a network address translation (NAT) gateway 1838 (e.g., the NAT gateway 1638 of FIG. 16). The control plane VCN 1816 can include the service gateway 1836 and the NAT gateway 1838.

The data plane VCN 1818 can include a data plane app tier 1846 (e.g., the data plane app tier 1646 of FIG. 16), a data plane DMZ tier 1848 (e.g., the data plane DMZ tier 1648 of FIG. 16), and a data plane data tier 1850 (e.g., the data plane data tier 1650 of FIG. 16). The data plane DMZ tier 1848 can include LB subnet(s) 1822 that can be communicatively coupled to trusted app subnet(s) 1860 and untrusted app subnet(s) 1862 of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s)

1830 that can be communicatively coupled to the service gateway 1836 contained in the data plane VCN 1818.

The untrusted app subnet(s) 1862 can include one or more primary VNICs 1864(1)-(N) that can be communicatively coupled to tenant virtual machines (VMs) 1866(1)-(N). Each tenant VM 1866(1)-(N) can be communicatively coupled to a respective app subnet 1867(1)-(N) that can be contained in respective container egress VCNs 1868(1)-(N) that can be contained in respective customer tenancies 1870(1)-(N). Respective secondary VNICs 1872(1)-(N) can facilitate communication between the untrusted app subnet(s) 1862 contained in the data plane VCN 1818 and the app subnet contained in the container egress VCNs 1868(1)-(N). Each container egress VCNs 1868(1)-(N) can include a NAT gateway 1838 that can be communicatively coupled to public Internet 1854 (e.g., public Internet 1654 of FIG. 16).

The Internet gateway 1834 contained in the control plane VCN 1816 and contained in the data plane VCN 1818 can be communicatively coupled to a metadata management service 1852 (e.g., the metadata management system 1652 of FIG. 16) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively couple to cloud services 1856.

In some embodiments, the data plane VCN 1818 can be integrated with customer tenancies 1870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1846. Code to run the function may be executed in the VMs 1866(1)-(N), and the code may not be configured to run anywhere else on the data plane VCN 1818. Each VM 1866(1)-(N) may be connected to one customer tenancy 1870. Respective containers 1871(1)-(N) contained in the VMs 1866(1)-(N) may be configured to run the code. In this case, there can be a dual isolation (e.g., the containers 1871(1)-(N) running code, where the containers 1871(1)-(N) may be contained in at least the VM 1866(1)-(N) that are contained in the untrusted app subnet(s) 1862), which may help prevent incorrect or otherwise undesirable code from damaging the network of the IaaS provider or from damaging a network of a different customer. The containers 1871(1)-(N) may be communicatively coupled to the customer tenancy 1870 and may be configured to transmit or receive data from the customer tenancy 1870. The containers 1871(1)-(N) may not be configured to transmit or receive data from any other entity in the data plane VCN 1818. Upon completion of running the code, the IaaS provider may kill or otherwise dispose of the containers 1871(1)-(N).

In some embodiments, the trusted app subnet(s) 1860 may run code that may be owned or operated by the IaaS provider. In this embodiment, the trusted app subnet(s) 1860 may be communicatively coupled to the DB subnet(s) 1830 and be configured to execute CRUD operations in the DB subnet(s) 1830. The untrusted app subnet(s) 1862 may be communicatively coupled to the DB subnet(s) 1830, but in this embodiment, the untrusted app subnet(s) may be configured to execute read operations in the DB subnet(s) 1830. The containers 1871(1)-(N) that can be contained in the VM 1866(1)-(N) of each customer and that may run code from the customer may not be communicatively coupled with the DB subnet(s) 1830.

In other embodiments, the control plane VCN 1816 and the data plane VCN 1818 may not be directly communicatively coupled. In this embodiment, there may be no direct communication between the control plane VCN 1816 and the data plane VCN 1818. However, communication can occur indirectly through at least one method. An LPG 1810 may be established by the IaaS provider that can facilitate communication between the control plane VCN 1816 and the data plane VCN 1818. In another example, the control plane VCN 1816 or the data plane VCN 1818 can make a call to cloud services 1856 via the service gateway 1836. For example, a call to cloud services 1856 from the control plane VCN 1816 can include a request for a service that can communicate with the data plane VCN 1818.

Figure 19:
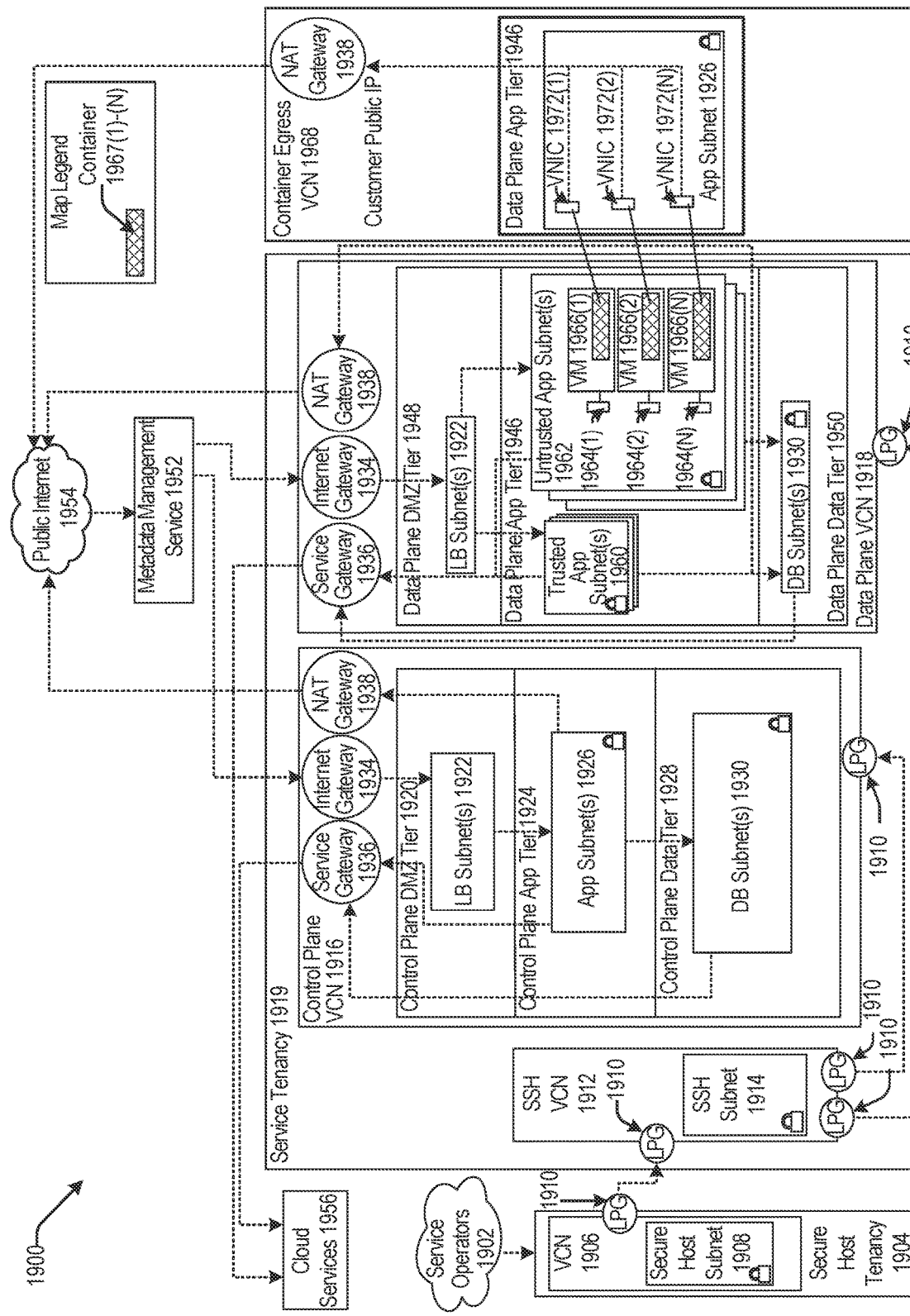
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1602 of FIG. 16) can be communicatively coupled to a secure host tenancy 1904 (e.g., the secure host tenancy 1604 of FIG. 16) that can include a virtual cloud network (VCN) 1906 (e.g., the VCN 1606 of FIG. 16) and a secure host subnet 1908 (e.g., the secure host subnet 1608 of FIG. 16). The VCN 1906 can include an LPG 1910 (e.g., the LPG 1610 of FIG. 16) that can be communicatively coupled to an SSH VCN 1912 (e.g., the SSH VCN 1612 of FIG. 16) via an LPG 1910 contained in the SSH VCN 1912. The SSH VCN 1912 can include an SSH subnet 1914 (e.g., the SSH subnet 1614 of FIG. 16), and the SSH VCN 1912 can be communicatively coupled to a control plane VCN 1916 (e.g., the control plane VCN 1616 of FIG. 16) via an LPG 1910 contained in the control plane VCN 1916 and to a data plane VCN 1918 (e.g., the data plane 1618 of FIG. 16) via an LPG 1910 contained in the data plane VCN 1918. The control plane VCN 1916 and the data plane VCN 1918 can be contained in a service tenancy 1919 (e.g., the service tenancy 1619 of FIG. 16).

The control plane VCN 1916 can include a control plane DMZ tier 1920 (e.g., the control plane DMZ tier 1620 of FIG. 16) that can include LB subnet(s) 1922 (e.g., LB subnet(s) 1622 of FIG. 16), a control plane app tier 1924 (e.g., the control plane app tier 1624 of FIG. 16) that can include app subnet(s) 1926 (e.g., app subnet(s) 1626 of FIG. 16), a control plane data tier 1928 (e.g., the control plane data tier 1628 of FIG. 16) that can include DB subnet(s) 1930 (e.g., DB subnet(s) 1830 of FIG. 18). The LB subnet(s) 1922 contained in the control plane DMZ tier 1920 can be communicatively coupled to the app subnet(s) 1926 contained in the control plane app tier 1924 and to an Internet gateway 1934 (e.g., the Internet gateway 1634 of FIG. 16) that can be contained in the control plane VCN 1916, and the app subnet(s) 1926 can be communicatively coupled to the DB subnet(s) 1930 contained in the control plane data tier 1928 and to a service gateway 1936 (e.g., the service gateway of FIG. 16) and a network address translation (NAT) gateway 1938 (e.g., the NAT gateway 1638 of FIG. 16). The control plane VCN 1916 can include the service gateway 1936 and the NAT gateway 1938.

The data plane VCN 1918 can include a data plane app tier 1946 (e.g., the data plane app tier 1646 of FIG. 16), a data plane DMZ tier 1948 (e.g., the data plane DMZ tier 1648 of FIG. 16), and a data plane data tier 1950 (e.g., the data plane data tier 1650 of FIG. 16). The data plane DMZ tier 1948 can include LB subnet(s) 1922 that can be communicatively coupled to trusted app subnet(s) 1960 (e.g., trusted app subnet(s) 1860 of FIG. 18) and untrusted app subnet(s) 1962 (e.g., untrusted app subnet(s) 1862 of FIG. 18) of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include primary VNICs 1964(1)-(N) that can be communicatively coupled to tenant virtual machines (VMs) 1966(1)-(N) residing within the untrusted app subnet(s) 1962. Each tenant VM 1966(1)-(N) can run code in a respective container 1967(1)-(N), and be communicatively coupled to an app subnet 1926 that can be contained in a data plane app tier 1946 that can be contained in a container egress VCN 1968. Respective secondary VNICs 1972(1)-(N) can facilitate communication between the untrusted app subnet(s) 1962 contained in the data plane VCN 1918 and the app subnet contained in the container egress VCN 1968. The container egress VCN can include a NAT gateway 1938 that can be communicatively coupled to public Internet 1954 (e.g., public Internet 1654 of FIG. 16).

The Internet gateway 1934 contained in the control plane VCN 1916 and contained in the data plane VCN 1918 can be communicatively coupled to a metadata management service 1952 (e.g., the metadata management system 1652 of FIG. 16) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively couple to cloud services 1956.

In some examples, the pattern illustrated by the architecture of block diagram 1900 of FIG. 19 may be considered an exception to the pattern illustrated by the architecture of block diagram 1800 of FIG. 18 and may be desirable for a customer of the IaaS provider if the IaaS provider cannot directly communicate with the customer (e.g., a disconnected region). The respective containers 1967(1)-(N) that are contained in the VMs 1966(1)-(N) for each customer can be accessed in real-time by the customer. The containers 1967(1)-(N) may be configured to make calls to respective secondary VNICs 1972(1)-(N) contained in app subnet(s) 1926 of the data plane app tier 1946 that can be contained in the container egress VCN 1968. The secondary VNICs 1972(1)-(N) can transmit the calls to the NAT gateway 1938 that may transmit the calls to public Internet 1954. In this example, the containers 1967(1)-(N) that can be accessed in real-time by the customer can be isolated from the control plane VCN 1916 and can be isolated from other entities contained in the data plane VCN 1918. The containers 1967(1)-(N) may also be isolated from resources from other customers.

In other examples, the customer can use the containers 1967(1)-(N) to call cloud services 1956. In this example, the customer may run code in the containers 1967(1)-(N) that requests a service from cloud services 1956. The containers 1967(1)-(N) can transmit this request to the secondary VNICs 1972(1)-(N) that can transmit the request to the NAT gateway that can transmit the request to public Internet 1954. Public Internet 1954 can transmit the request to LB subnet(s) 1922 contained in the control plane VCN 1916 via the Internet gateway 1934. In response to determining the request is valid, the LB subnet(s) can transmit the request to app subnet(s) 1926 that can transmit the request to cloud services 1956 via the service gateway 1936.

It should be appreciated that IaaS architectures 1600, 1700, 1800, 1900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 20:
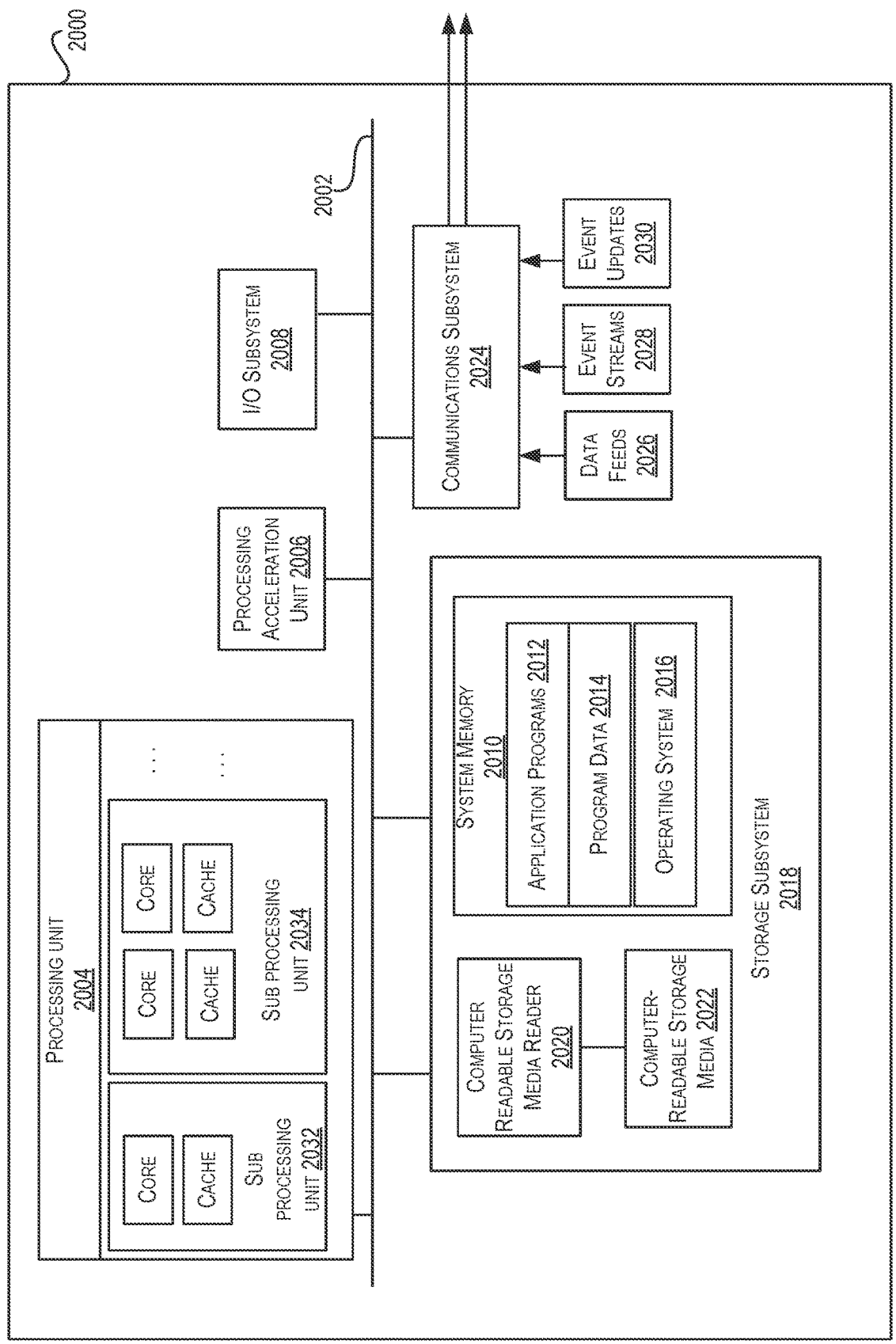
FIG. 20 is a block diagram illustrating an example computer system, according to at least one embodiment.

FIG. 20 illustrates an example computer system 2000, in which various embodiments may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 2018 may also provide a tangible computer-readable storage medium for storing the basic programming and data constructs that provide the functionality of some embodiments. Software (programs, code modules, instructions) that when executed by a processor provide the functionality described above may be stored in storage subsystem 2018. These software modules or instructions may be executed by processing unit 2004. Storage subsystem 2018 may also provide a repository for storing data used in accordance with the present disclosure.

Storage subsystem 2000 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2000.

By way of example, computer-readable storage media 2022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   obtaining, by a computer system, using a query language specification for an Application Programming Interface (API) and a server-side runtime for executing queries, an API schema comprising a set of one or more object types, an object type in the set of one or more object types comprising a set of one or more fields associated with the object type;
   for an object type in the set of object types, generating, by the computer system, a filter input object for the object type for performing a filtering operation on the object type, the filter input object comprising a set of object attributes, an object attribute in the set of object attributes corresponding to a field in the set of one or more fields associated with the object type;
   for an object attribute in the set of object attributes, generating, by the computer system, a filter input object datatype for the object attribute, wherein the filter input object datatype for the object attribute is specific to a datatype of the field of the object type corresponding to the object attribute;
   for the filter input object for the object type, generating, by the computer system, an expression attribute for the filter input object and a logical attribute for the filter input object;
   generating, by the computer system, a query object type for the object type, the query object type identifying a query operation to be performed on the object type, the query operation comprising a filter input variable that identifies the filter input object associated with the object type for performing the filtering operation on the object type;
   providing, by the computer system, the API schema comprising the set of one or more object types, the filter input object associated with the object type, the filter input object datatype associated with the object attribute and the query object associated with the object type, via a user interface associated with the computer system;
   receiving, by the computer system, a query request, the query request identifying the query operation to be performed on the object type, the query operation comprising the filter input variable, the filter input variable identifying at least a first expression and a second expression to be evaluated by the query operation, the first expression and the second expression defined using the expression attribute defined in the filter input object associated with the object type;
   executing, by the computer system, the query request against a backend datasource to obtain a query result; and
   transmitting, by the computer system, the query result via the user interface associated with the computer system.

2. The method of claim 1, further comprising:
   for the filter input object datatype associated with the object attribute, generating, by the computer system, a set of condition attributes that are specific to the filter input object datatype associated with the object attribute.

3. The method of claim 2, wherein a condition attribute in the set of condition attributes identifies a condition that can be applied to the object attribute associated with the filter input object and a value associated with the condition.

4. The method of claim 1, wherein the first expression and the second expression in the query operation to be evaluated are combined using a logical operator, wherein the logical operator is defined in the query operation using the logical attribute associated with the filter input object.

5. The method of claim 1, wherein the first expression in the query operation comprises (a) a first set of object attributes associated with the filter input object, (b) a first set of condition attributes applied to the first set of object attributes, wherein a condition attribute in the first set of conditional attributes that is applied to an object attribute in the first set of object attributes is specific to the filter input object datatype associated with the object attribute and (c) a value associated with the condition attribute.

6. The method of claim 5, wherein the second expression in the query operation comprises (a) a second set of object attributes of the filter input object, (b) a second set of conditional attributes applied to the second set of object attributes, wherein a conditional attribute in the second set of conditional attributes that is applied to an object attribute in the second set of object attributes is specific to the filter input object datatype associated with the object attribute and (c) a value associated with the conditional attribute.

7. The method of claim 5, wherein at least one object attribute in the first set of object attributes in the first expression is different from an object attribute in the second set of object attributes in the second expression.

8. The method of claim 5, wherein at least one conditional attribute in the first set of conditional attributes in the first expression is different from at least one conditional attribute in the second set of conditional attributes in the second expression.

9. The method of claim 1, further comprising generating a negation operator attribute for the filter input object for the object type.

10. The method of claim 9, wherein the first expression and the second expression in the query operation to be evaluated are combined using a negation operator, wherein the negation operator is defined in the query operation using the negation operator attribute associated with the filter input object.

11. The method of claim 1, wherein the expression attribute is represented as an array of elements, where each element in the array of elements is a filter input object.

12. The method of claim 1, further comprising modifying the filter input object, wherein modifying the filter input object comprises adding one or more object attributes in the set of object attributes defined for the filter input object.

13. The method of claim 1, further comprising modifying the filter input object, wherein modifying the filter input object comprises removing one or more object attributes in the set of object attributes defined for the filter input object.

14. The method of claim 1, further comprising generating, by the computer system, a set of resolver functions for the set of one or more object types defined in the API schema.

15. The method of claim 1, wherein executing, by the computer system, the query request against a backend datasource to obtain the query result comprises translating the query operation in the query request into a resolver query for execution against the backend datasource.

16. A system comprising:
a memory; and
one or more processors configured to perform processing, the processing comprising:
obtaining an API schema comprising a set of one or more object types, an object type in the set of one or more object types comprising a set of one or more fields associated with the object type;
for an object type in the set of object types, generating a filter input object for the object type for performing a filtering operation on the object type, the filter input object comprising a set of object attributes, an object attribute in the set of object attributes corresponding to a field in the set of one or more fields associated with the object type;
for an object attribute in the set of object attributes, generating a filter input object datatype for the object attribute, wherein the filter input object datatype for the object attribute is specific to a datatype of the field of the object type corresponding to the object attribute;

for the filter input object for the object type, generating an expression attribute for the filter input object and a logical attribute for the filter input object;
generating a query object type for the object type, the query object type identifying a query operation to be performed on the object type, the query operation comprising a filter input variable that identifies the filter input object associated with the object type for performing the filtering operation on the object type;
providing the API schema comprising the set of one or more object types, the filter input object associated with the object type, the filter input object datatype associated with the object attribute and the query object associated with the object type, via a user interface associated with a system;
receiving a query request, the query request identifying the query operation to be performed on the object type, the query operation comprising the filter input variable, the filter input variable identifying at least a first expression and a second expression to be evaluated by the query operation, the first expression and the second expression defined using the expression attribute defined in the filter input object associated with the object type;
executing the query request against a backend datasource to obtain a query result; and
transmitting the query result via the user interface associated with the computer system.

17. The system of claim 16, further comprising:
for the filter input object datatype associated with the object attribute, generating, a set of condition attributes that are specific to the filter input object datatype associated with the object attribute, wherein a condition attribute in the set of condition attributes identifies a condition that can be applied to the object attribute associated with the filter input object and a value associated with the condition.

18. A non-transitory computer-readable medium storing instructions executable by a computer system that, when executed by one or more processors of the computer system, cause the one or more processors to perform operations comprising:
obtaining an API schema comprising a set of one or more object types, an object type in the set of one or more object types comprising a set of one or more fields associated with the object type;
for an object type in the set of object types, generating a filter input object for the object type for performing a filtering operation on the object type, the filter input object comprising a set of object attributes, an object attribute in the set of object attributes corresponding to a field in the set of one or more fields associated with the object type;
for an object attribute in the set of object attributes, generating a filter input object datatype for the object attribute, wherein the filter input object datatype for the object attribute is specific to a datatype of the field of the object type corresponding to the object attribute;
for the filter input object for the object type, generating an expression attribute for the filter input object and a logical attribute for the filter input object;
generating query object type for the object type, the query object type identifying a query operation to be performed on the object type, the query operation comprising a filter input variable that identifies the filter input object associated with the object type for performing the filtering operation on the object type;

providing the schema comprising the set of one or more object types, the filter input object associated with the object type, the filter input object datatype associated with the object attribute and the query object associated with the object type, via a user interface associated with the computer system;

receiving a query request, the query request identifying the query operation to be performed on the object type, the query operation comprising the filter input variable, the filter input variable identifying at least a first expression and a second expression to be evaluated by the query operation, the first expression and the second expression defined using the expression attribute defined in the filter input object associated with the object type;

executing the query request against a backend datasource to obtain a query result; and transmitting the query result via the user interface associated with the computer system.

19. The non-transitory computer-readable medium of claim 18, wherein the first expression in the query operation comprises (a) a first set of object attributes associated with the filter input object, (b) a first set of condition attributes applied to the first set of object attributes, wherein a condition attribute in the first set of conditional attributes that is applied to an object attribute in the first set of object attributes is specific to the filter input object datatype associated with the object attribute and (c) a value associated with the condition attribute.

* * * * *